(12) United States Patent
Sanz et al.

(10) Patent No.: US 9,499,265 B2
(45) Date of Patent: Nov. 22, 2016

(54) UNMANNED AERIAL VEHICLE LANDING INTERFACE

(71) Applicant: Skycatch, Inc., San Francisco, CA (US)

(72) Inventors: Christian Sanz, San Francisco, CA (US); Samuel Giles Miller, Folsom, CA (US); Jonathan Shyaun Noorani, Orangevale, CA (US); Behrooze Sirang, San Francisco, CA (US)

(73) Assignee: SKYCATCH, INC., San Francisco, CA (US)

( * ) Notice: Subject to any disclaimer, the term of this patent is extended or adjusted under 35 U.S.C. 154(b) by 0 days.

(21) Appl. No.: 14/815,930

(22) Filed: Jul. 31, 2015

(65) Prior Publication Data

US 2016/0001883 A1 Jan. 7, 2016

Related U.S. Application Data

(63) Continuation-in-part of application No. 14/586,913, filed on Dec. 30, 2014, now abandoned.

(60) Provisional application No. 62/020,126, filed on Jul. 2, 2014.

(51) Int. Cl.
*B64C 25/00* (2006.01)
*B64C 39/02* (2006.01)
*H02J 7/00* (2006.01)
*B64F 1/02* (2006.01)

(52) U.S. Cl.
CPC .............. *B64C 39/024* (2013.01); *B64F 1/02* (2013.01); *H02J 7/0042* (2013.01); *B64C 25/00* (2013.01); *B64C 2201/027* (2013.01); *B64C 2201/108* (2013.01); *B64C 2201/146* (2013.01); *B64C 2201/18* (2013.01); *B64C 2201/182* (2013.01); *B64C 2201/201* (2013.01)

(58) Field of Classification Search
CPC ..... B64C 25/00; B64C 25/001; B64C 25/32; B64C 25/34; B64C 25/52; B64C 2025/325; B64C 29/0091; B64C 2201/12; B64C 2201/18; B64C 2201/108; B64C 39/024; B64F 1/12; B64F 1/36; B64F 1/005; B64F 3/00; B64F 2700/6203
See application file for complete search history.

(56) References Cited

U.S. PATENT DOCUMENTS

| | | | |
|---|---|---|---|
| 7,391,340 B2 * | 6/2008 | Malhomme | B64F 1/007 244/110 E |
| 9,139,310 B1 * | 9/2015 | Wang | B64F 1/36 |
| 9,290,277 B2 * | 3/2016 | You | B64F 1/18 |
| 2004/0167682 A1 * | 8/2004 | Beck | B60K 17/356 701/3 |
| 2006/0170568 A1 * | 8/2006 | Malhomme | B64F 1/007 340/981 |
| 2011/0068224 A1 * | 3/2011 | Kang | B64C 39/024 244/116 |
| 2014/0236390 A1 * | 8/2014 | Mohamadi | B64C 19/00 701/2 |
| 2015/0069968 A1 * | 3/2015 | Pounds | B60L 11/1818 320/109 |

(Continued)

*Primary Examiner* — Tien Dinh
*Assistant Examiner* — Michael A Fabula
(74) *Attorney, Agent, or Firm* — Keller Jolley Preece

(57) ABSTRACT

The present disclosure is directed toward systems and methods for autonomously landing an unmanned aerial vehicle (UAV). In particular, systems and methods described herein enable a UAV to land within and interface with a UAV ground station (UAVGS). In particular, one or more embodiments described herein include systems and methods that enable a UAV to conveniently interface with and land within a UAV ground station (UAVGS). For example, one or more embodiments include a UAV that includes a landing base and landing frame that interfaces with a landing housing of a UAVGS.

17 Claims, 11 Drawing Sheets

(56) References Cited

U.S. PATENT DOCUMENTS

2015/0120094 A1* 4/2015 Kimchi ................ B64C 39/024 701/3
2015/0266575 A1* 9/2015 Borko ................... B64C 39/024 701/3
2016/0011592 A1* 1/2016 Zhang .................... B64F 1/362 701/2
2016/0039300 A1* 2/2016 Wang ................... B60L 11/1822 244/39
2016/0039541 A1* 2/2016 Beardsley ........... B60L 11/1816 701/2

* cited by examiner

UNMANNED AERIAL VEHICLE LANDING INTERFACE

CROSS-REFERENCE TO RELATED APPLICATIONS

This application is a continuation-in-part of U.S. patent application Ser. No. 14/586,913, filed Dec. 30, 2014, which claims the benefit of and priority to U.S. Provisional Patent Application 62/020,126, filed Jul. 2, 2014. The entire contents of the foregoing patent application are hereby incorporated by reference.

BACKGROUND

1. Technical Field

One or more embodiments of the present disclosure generally relate to autonomous flight of an unmanned aerial vehicle (UAV). More specifically, one or more embodiments relate to landing a UAV and interfacing the UAV within a UAV ground station (UAVGS).

2. Background and Relevant Art

Aerial photography and videography are becoming increasingly common in providing images and videos in various industries. For example, aerial photography and videography provides tools for construction, farming, real estate, search and rescue, and surveillance. In recent years, UAVs have provided an improved economical approach to aerial photography and videography compared to capturing photos and videos from manned aircraft or satellites.

There is increasing interest in the use of unmanned aerial vehicles ("UAVs") to obtain aerial imagery. For example, a UAV including an on-board camera can easily fly over various geographic areas in order to collect overhead photographs and/or videos. Typically, UAVs are remote controlled, thus necessitating an operator to control the movements of the UAV. This becomes problematic, however, when the UAV is deployed over harsh terrain (e.g., mountains) or over large areas of land. In such cases, an operator would have difficulty finding a control position (e.g., the physical location of the operator) to allow the operator to successfully control the UAV. For instance, mountains or large areas of land will generally not allow an operator to maintain the UAV within a viewing range to successfully operate the UAV.

In some circumstances, the UAV operator does not need to be within a viewing range of the UAV. For example, some conventional UAVs provide an operator real-time video captured from the UAV for long-range remote control of the UAV. In a long-range remote control scenario, however, additional problems arise with conventional UAVs and conventional UAV systems. For example, long-range remote control scenarios often include the need to remotely land a UAV (e.g., in order to recharge or replace a battery). The remote landing process for an operator, however, is often difficult and error-prone, which increases the probability of damaging or destroying a UAV, resulting in considerable expense. In addition, a damaged UAV can delay a project, causing additional time and expense.

Using conventional UAV systems, some operators can become fairly proficient in remotely landing a UAV. Frequently, however, an operator requires extensive training and practice to be able to successfully remotely land a UAV on a consistent basis. The time and expense required to train an operator to perform remote UAV landings is cost prohibitive to many companies that would benefit from the use of a UAV. Moreover, even when adequately trained, an operator still has a fairly high risk of damaging or destroying a UAV during a remote UAV landing.

Accordingly, there are a number of considerations to be made in landing UAVs.

BRIEF SUMMARY

The principles described herein provide benefits and/or solve one or more of the foregoing or other problems in the art with systems and methods that enable autonomous landing of an unmanned aerial vehicle (UAV). In particular, one or more embodiments described herein include systems and methods that enable a UAV to conveniently interface with and land within a UAV ground station (UAVGS). For example, one or more embodiments include a UAV that includes a landing base and landing frame that interfaces with a landing housing of a UAVGS in a manner that allows the UAV to automatically land with accuracy.

For example, in one or more embodiments, systems and methods include features that cause the UAV to guide itself within a landing housing of the UAVGS. For instance, the UAV can include a landing base having a complementary shape to a shape of the landing housing of the UAVGS. When the UAV comes into contact with the UAVGS, the shape of the landing base and/or the landing housing can cause the UAV to self-align within the UAVGS as the UAV docks within the landing housing of the UAVGS. As such, the UAV can safely land within the UAVGS with minimal error and without a substantial risk of damaging or destroying the UAV during a UAV landing.

Furthermore, in one or more embodiments, systems and methods include features and functionality that facilitate charging, or replacing, a power source within the UAV when the UAV lands within the UAVGS. For example, the UAV can include charging contacts that couple to charging contacts on the UAVGS when the UAV lands within a landing housing of the UAVGS. When the UAV charging contacts are in contact with the UAVGS charging contacts, the UAVGS can charge a battery on the UAV. Additionally, in one or more embodiments, systems and methods include features and functionality that cause one or more charging contacts of the UAV to automatically align with and couple to the corresponding charging contacts on the UAVGS. For example, the charging contacts of the UAV and the UAVGS can each have an arrangement such that they align with each other when the UAV lands within the UAVGS.

Additional features and advantages of exemplary embodiments will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the embodiments can be obtained, a more particular description of the principles briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, principles will be described and explained with additional specificity and detail through the use of the accompanying drawings.

DETAILED DESCRIPTION

Figure 1:
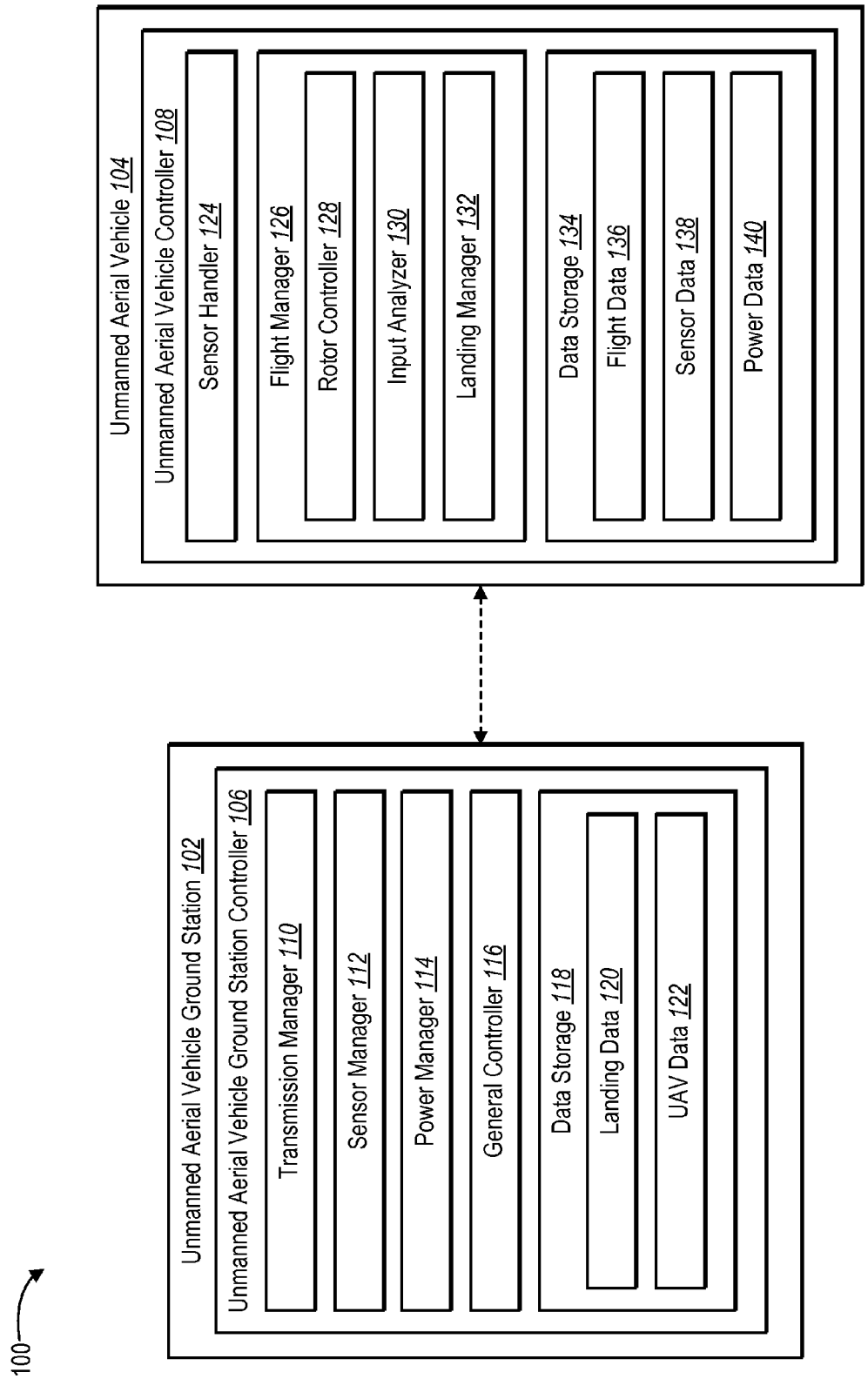
FIG. 1 illustrates a schematic diagram of an autonomous landing system in accordance with one or more embodiments.

One or more embodiments described herein include an autonomous landing system. For example, the autonomous landing system described herein manages an autonomous landing of a UAV in connection with a UAVGS. The autonomous landing system described herein includes components that enable a UAV to autonomously land within a landing housing of a UAVGS. For example, in one or more embodiments, an autonomous landing system includes a UAV having a main body, one or more rotors coupled to the main body, and a landing base coupled to the main body. Additionally, the autonomous landing system can include a UAVGS that includes a landing housing that receives the UAV when the UAV lands within the UAVGS. In one or more embodiments, the landing base has a size and shape that enables the UAV to land within a complimentary-shaped landing housing of the UAVGS and interface with one or more components of the UAVGS.

In one or more embodiments, the autonomous landing system includes a self-aligning interface that enables a UAV to conveniently and accurately land within a UAVGS. For example, in one or more embodiments, the UAV can include a landing base having a shape that is complimentary to a shape of a landing housing of the UAVGS. For example, in one or more embodiments, the landing base includes a conical shape that makes contact with a complimentary shaped conical landing housing of the UAVGS. As a result, when the UAV is landing and makes contact with the UAVGS, the landing base of the UAV can self-align within the landing housing of the UAVGS.

In addition to facilitating alignment of the UAV with respect to the UAVGS, the autonomous landing system optionally further includes one or more features that enable a battery on the UAV to be charged or replaced when the UAV is within the UAVGS. For example, autonomous landing system can provide a convenient charging interface between the UAV and the UAVGS. In one or more embodiments, the UAVGS charges a battery or other power source on board the UAVGS when one or more charging contacts on the UAV couple to one or more corresponding UAVGS charging contacts. Additionally, the arrangement of contacts on both the UAV and the UAVGS can facilitate a connection between the UAV and the UAVGS that provides an electrical current that passes between particular nodes of a battery assembly and charges the battery onboard the UAV. As such, the autonomous landing system can enable convenient charging of a battery when the UAV lands within the UAVGS.

More particularly, the UAVGS can include an arrangement of charging contacts within the landing interface that causes one or more charging contacts of the UAV to automatically align with and couple to corresponding contacts within the UAVGS upon landing of the UAV within the UAVGS. For example, in one or more embodiments, the UAV includes a plurality of charging contacts positioned around a landing base of the UAV. Additionally, the UAVGS can include one or more charging contacts. In one or more embodiments, the arrangement of the charging contacts on the UAV can ensure that at least one of the charging contacts on the UAV couples to a corresponding UAVGS charging contacts when the UAV lands within the UAVGS. Additionally, the arrangement of the charging contacts on the UAV can ensure that a particular subset of charging contacts on the UAV couple to corresponding UAVGS charging contacts when the UAV lands within the UAVGS. As such, charging contacts on the UAV and the UAVGS can automatically align and establish an electrical connection between the UAV and the UAVGS.

In addition, or as an alternative, to providing a charging interface, the autonomous landing system can provide quick and convenient replacement of a battery within the UAV. For example, the UAVGS can include a battery arm capable of gripping a battery assembly on board the UAV and both removing the battery from the UAV and replacing the battery with an already charged battery. In particular, the battery arm can remove a battery assembly within a UAV when the UAV is landed within a landing housing of the UAVGS. As such, the autonomous landing system can provide quick and convenient replacement of battery power to enable multiple consecutive flights within a short period of time.

The term "unmanned aerial vehicle" ("UAV"), as used herein, generally refers to an aircraft that can be piloted autonomously or remotely by a control system. For example, a "drone" is a UAV that can be used for multiple purposes or applications (e.g., military, agriculture, surveillance, etc.). In one or more embodiments, the UAV includes onboard computers that control the autonomous flight of the UAV. In at least one embodiment, the UAV is a multi-rotor vehicle, such as a quadcopter, and includes a carbon fiber shell, integrated electronics, a battery bay (including a battery assembly), a global positioning system ("GPS") receiver, a fixed or swappable imaging capability (e.g., a digital camera), and various sensors or receivers. The UAV can also include a computing device including programmed instructions that allow the UAV to takeoff, fly, and land autonomously.

The term "unmanned aerial vehicle ground station" ("UAVGS"), as used herein, generally refers to an apparatus from which a UAV can takeoff, and where the UAV can later land and be stored until its next flight. For example, the UAVGS can include a carbon fiber box containing a UAV storage area that functions as a takeoff area and/or a landing pad when the UAV is not being stored. In at least one embodiment, following the autonomous landing of the UAV, one or more systems of the UAVGS can recharge or swap-out one or more batteries of the UAV, download data (e.g., digital photographs, digital videos, sensor readings, etc.) collected by the UAV. In one or more embodiments, the UAVGS allows for wireless communication between the UAVGS and a server to transfer of data collected by the UAV and downloaded to the UAVGS to the server.

FIG. 1 illustrates a schematic diagram showing an example embodiment of an autonomous landing system 100 (or simply "system 100"). As shown in FIG. 1, the system 100 may include various components for performing the processes and features described herein. For example, as shown in FIG. 1, the system 100 may include, but is not limited to, an unmanned aerial vehicle ground station 102 (or simply "UAVGS 102") and an unmanned aerial vehicle 104 (or simply "UAV 104"). As shown in FIG. 1, the UAVGS 102 can include a UAVGS controller 106, which in turn can include, but is not limited to, a transmission manager 110, sensor manager 112, power manager 114, a general controller 116, and data storage 118 including landing data 120 and UAV data 122. As shown in FIG. 1, the UAV 104 can include a UAV controller 108, which in turn can include, but is not limited to, a sensor handler 124, a flight manager 126, and a data storage 134. As shown in FIG. 1, the flight manager 126 can include a rotor controller 128, an input analyzer 130, and a landing manager 132. As FIG. 1 further shows, the data storage 134 can further include flight data 136, sensor data 138, and power data 140.

Each of the components 110-122 of the UAVGS controller 106, and the components 124-140 of the UAV controller 108 can be implemented using a computing device including at least one processor executing instructions that cause the system 100 to perform the processes described herein. In some embodiments, the components 106-122 and 124-140 can comprise hardware, such as a special-purpose processing device to perform a certain function. Additionally or alternatively, the components 106-122 and 124-140 can comprise a combination of computer-executable instructions and hardware. For instance, in one or more embodiments the UAV 104 and/or the UAVGS 102 include one or more computing devices, such as the computing device described below with reference to FIG. 10. In one or more embodiments, the UAVGS controller 106 and the UAV controller 108 can be native applications installed on the UAVGS 102 and the UAV 104, respectively. In some embodiments, the UAVGS controller 106 and the UAV controller 108 can be remotely accessible over a wireless network.

Additionally, while FIG. 1 illustrates a UAVGS controller 106 having components 110-122 located thereon, it is appreciated that the UAV controller 108 can include similar components having features and functionality described herein with regard to the UAVGS controller 106. Similarly, while FIG. 1 illustrates a UAV controller 108 having components 124-140 located thereon, it is appreciated that the UAVGS controller 106 can include similar components having features and functionality described herein with regard to the UAV controller 108. As such, one or more features described herein with regard to the UAVGS controller 106 or the UAV controller 108 can similarly apply to both the UAVGS controller 106 and/or the UAV controller 108.

As described above, the system 100 includes components across both the UAVGS 102 and the UAV 104 that enable the UAV 104 to autonomously land on the UAVGS 102. Accordingly, the system 100 includes various components that autonomously guide the UAV 104 to land on the UAVGS 102 without any external intervention (e.g., without an operator remotely controlling the UAV during the landing process). As mentioned above, the guidance system can include the use of transmitters on the UAVGS 102 that each transmits one or more different types of energy. Also as mentioned above, the guidance system can include the use of sensors on the UAV 104 that each detects one or more of types of energy that the UAVGS 102 transmits. By utilizing the transmitters on the UAVGS 102 to transmit energy, and the sensors on the UAV 104 to detect the energy, the system 100 can autonomously guide and land the UAV 104 onto the UAVGS 102.

Accordingly, as mentioned above and as illustrated in FIG. 1, the UAVGS controller 106 includes a transmission manager 110. In one or more embodiments, the transmission manager 110 controls the transmissions of all applicable types of energy from the UAVGS 102 for the purpose of guiding a UAV 104 for autonomous landing at the UAVGS 102. For example, the transmission manager 110 can control transmissions of energy from the UAVGS 102 including light energy, electromagnetic energy, radio frequency energy, infrared energy, and other types of detectable energy.

For example, the transmission manager 110 can control or otherwise manage a transmission of a particular pattern of energy and/or energy type to guide the UAV 104 within a threshold distance of the UAVGS 102. For instance, in one or more embodiments, the UAV 104 can transmit an energy wave to facilitate short-range guidance of the UAV 104 to within a vertical space positioned above a landing housing of the UAVGS 102. As such, the transmission manager 110 can control a transmission of an energy field that brings a UAV 104 within a docking space of the UAVGS 102.

In addition to the transmission manager 110, the UAVGS controller 106 also includes a sensor manager 112 that can sense various conditions surrounding a UAVGS 102 and/or UAV 104. In one or more embodiments, the transmission manager 110 may control the transmission of different types of energy based on conditions surrounding the UAVGS 102. For example, on a foggy day, the transmission manager 110 may determine to transmit a type of energy wave other than a light energy wave because the light energy wave would be hard for the UAV 104 to perceive through the fog. Accordingly, in order to identify conditions surrounding the UAVGS 102, the sensor manager 112 can sense various conditions including weather conditions (e.g., rain, fog), barometric pressure, wind, light, and so forth.

Additionally, as shown in FIG. 1, the UAV controller 106 includes a power manager 114. In one or more embodiments, the power manager 114 controls a charging interface for charging one or more batteries on board the UAV 104. For example, when a UAV 104 lands within a landing housing of the UAVGS 102 and forms an electrical connection between charging contacts on the UAV and UAVGS charging contacts, the power manager 114 can detect the electrical connection between the various contacts and cause the UAVGS 102 to charge the battery of the UAV 104. In one or more embodiments, power manager 114 charges the UAV 104 in response to detecting that the UAV 104 has landed within the UAVGS 102 and established an electrical connection between charging contacts on the UAV and corresponding UAV charging contacts. Alternatively, the power manager 114 can charge the UAV 104 in response to receiving a user input or confirmation to charge a power source of the UAV 104.

In addition to or as an alternative to charging one or more batteries on board the UAV 104, the power manager 114 can manage replacement of a replaceable battery on board the UAV 104 via a battery arm on the UAVGS 102. For example, when the UAV 104 lands within a landing housing of the UAVGS 102, the power manager 104 can detect that the UAV 104 has landed within the UAVGS 102 and cause a battery arm on the UAVGS 102 to remove a battery assembly from within a receiving slot on the UAV 104. In addition, the power manager 104 can cause the battery arm to place the removed battery within a slot on the UAVGS 102 and insert a new (e.g., charged) battery within the receiving slot of the UAV 104. Further, in one or more embodiments, the power manager 114 can control a system for charging the removed battery placed within the slot on the UAVGS 102 and placing the battery within the same or different UAV 104 that lands within the UAVGS 102.

As mentioned above, and as illustrated in FIG. 1, the UAVGS controller 106 also includes a general controller 116. In one or more embodiments, the general controller 116 can handle general system tasks including, for example, data storage, UAV docking, receiving and processing user input, etc. As an example, after the UAV 104 autonomously lands on the UAVGS 102, the general controller 116 can manage receiving and processing user input with regard to recharging a battery while the UAV 104 is landed or, alternatively, replacing a battery with a battery arm. As another example, in one or more embodiments, the general controller 116 can manage downloading or transferring data collected by the UAV 104 (e.g., during a previous flight).

Furthermore, as mentioned above, and as illustrated in FIG. 1, the UAVGS controller 106 also includes a data storage 118. As shown, the data storage 118 can include landing data 120, and UAV data 122. In one or more embodiments, the landing data 120 can include data representative of landing information associated with the UAV 104. Similarly, in one or more embodiments, the UAV data 122 can include data representative of information associated with the UAV 104.

As described above, the system 100 enables the UAV 104 to land autonomously on the UAVGS 102. Accordingly, in one or more embodiments, the UAV 104 includes a UAV controller 108 that detects and uses the energy provided by the UAVGS 102 to autonomously land the UAV 104 on the UAVGS 102. For example, in one or more embodiments, the UAV controller 108 detects the energy the UAVGS 102 transmits, and then uses the detected energy to determine how to guide the UAV 104 (e.g., based on one or more characteristics of the detected energy, the UAV controller 108 can cause the UAV 104 to perform one or more maneuvers).

As shown in FIG. 1, the UAV controller 108 includes a sensor handler 124 that manages and generates input based on one or more signals detected by the UAV 104 and/or based on one or more signals provided to the UAV 104 by the UAVGS 102. Additionally, the sensor handler 124 can manage one or more cameras and/or a variety of energy sensors (e.g., electromagnetic energy wave sensors, infrared energy wave sensors, radio frequency wave sensors, etc.). In particular, the sensor handler 124 can control directions, angles, filters, sensor activation, sensor sensitivity, and other features and functionality provided by the various sensors on board the UAV controller 108.

Further, as shown in FIG. 1, the UAV controller 108 also includes a flight manager 126. In one or more embodiments, and in order for the UAV 104 to autonomously land on the UAVGS 102, the flight manager 126 can control all of the mechanical flight elements associated with the UAV 104 (e.g., motors, rotor arms, rotors, landing gear, etc.). For example, in at least one embodiment, the flight manager 126 can receive inputs from the sensor handler 124. The flight manager 126 can then control various mechanical features of the UAV 104 based on the received inputs from the sensor handler 124 in order to autonomously land the UAV 104 on the UAVGS 102.

As illustrated in FIG. 1, the flight manager 126 includes a rotor controller 128. In one or more embodiments, the rotor controller 128 controls the speed of one or more rotors associated with the UAV 104. For example, as illustrated in FIG. 1, the UAV 104 includes four horizontally mounted rotors. Accordingly, by controlling the speed of the horizontally mounted rotors, the rotor controller 128 can cause the UAV 104 to travel up and down vertically. Additionally, in one or more embodiments, the rotor controller 128 controls the pitch of the UAV 104 by controlling the relative speeds of the rotors. Accordingly, by controlling the pitch of the UAV 104, the rotor controller 128 can cause the UAV 104 to travel back and forth, and side to side horizontally. Thus it follows that, by controlling the speed and pitch of one or more rotors associated with the UAV 104, the rotor controller 128 can cause the UAV 104 to travel anywhere within an uninhibited three-dimensional space.

Also as illustrated in FIG. 1, the flight manager 126 includes an input analyzer 130. In one or more embodiments, the input analyzer 130 analyzes the data or inputs received from the sensor handler 124 in order to determine a position of the UAV 104. For example, in one embodiment, the input analyzer 130 can analyze digital photographs or video provided by a camera on the UAV 104 to determine whether the UAV 104 is located in a position above the UAVGS 102. In another example, the input analyzer 130 can analyze energy sensor readings of an energy wave to determine how far above the UAVGS 102 the UAV is located 104 (e.g., the altitude of the UAV). The input analyzer 130 can utilize algorithms, lookup tables, etc. in order to determine the UAV's 104 position based on inputs received from the sensor handler 120. Additionally, in at least embodiment, the input analyzer 130 can receive inputs from a global position system associated with the UAV 104 in order to determine the UAV's 104 position.

As mentioned above, the flight manager 126 can further include a landing manager 132. Once the input analyzer 130 determines the position of the UAV 104, the landing manager 132 can determine how the UAV's 104 position needs to change in order to complete an autonomous landing sequence. In one or more embodiments, the landing manager 132 includes various flight sequences that include decision trees to determine how to move the UAV 104 from one landing phase to the next. For example, landing phases in an autonomous landing sequence can include: a centering phase, wherein the landing manager 132 centers the UAV 104 over the UAVGS 102; a descent phase, wherein the landing manager 132 causes the UAV 104 to move toward the UAVGS 102 in a controlled descent; a correction phase, wherein the landing manager 132 corrects the position of the UAV 104 due to a gust of wind or debris interference; and a docking phase, wherein the landing manager 132 causes the flight components of the UAV 104 to shut off, effectively docking the UAV 104 in the UAVGS 102. Accordingly, the input analyzer 130 can comprise various sets of instructions or decisions trees that correspond to each of the phases of a landing sequence.

As an example, the sensor handler 124 can detect that the UAV 104 is within a threshold distance or touching a landing housing of the UAVGS 102. The sensor handler 124 can provide an input to the input analyzer 130, which analyzes the sensor input and determines that the UAV 104 is within a docking distance from the UAVGS 102. Accordingly, the landing manager 132 can cause the rotor controller 128 to cut some or all power to the rotors associated with the UAV 104. With no power to the rotors, and with the UAV 104 within an effective docking distance from the UAVGS 102, the UAV 104 can land within the landing housing of the UAVGS 102. Additionally, as will be described in greater detail below, the UAVGS 102 and the UAV 104 may include additional features that enable the UAV 104 to self-align within the landing housing of the UAVGS 102 as the UAV 104 is landing and/or when the rotor controller 128 cuts power to the rotors to enable the UAV 104 to land.

Furthermore, as mentioned above, and as illustrated in FIG. 1, the UAV controller 108 also includes a data storage 134. As shown, the data storage 134 can include flight data 136 and sensor data 138. In one or more embodiments, the flight data 136 can include data representative of the UAV's 104 flight, such as described herein (e.g., GPS information, camera information, etc.). Similarly, in one or more embodiments, the sensor data 138 can include data representative of information gathered by one or more sensors located on the UAV 104. Additionally, in one or more embodiments, the data storage 134 can include power data 140. The power data 140 can include data representative of power information associated with a battery and/or one or more power systems on board the UAV 104. For example, the power data 140 can include a battery level, a remaining life of a battery, or a time for the battery on board the UAV 104 to recharge when docked within the UAVGS 102.

Figure 2:
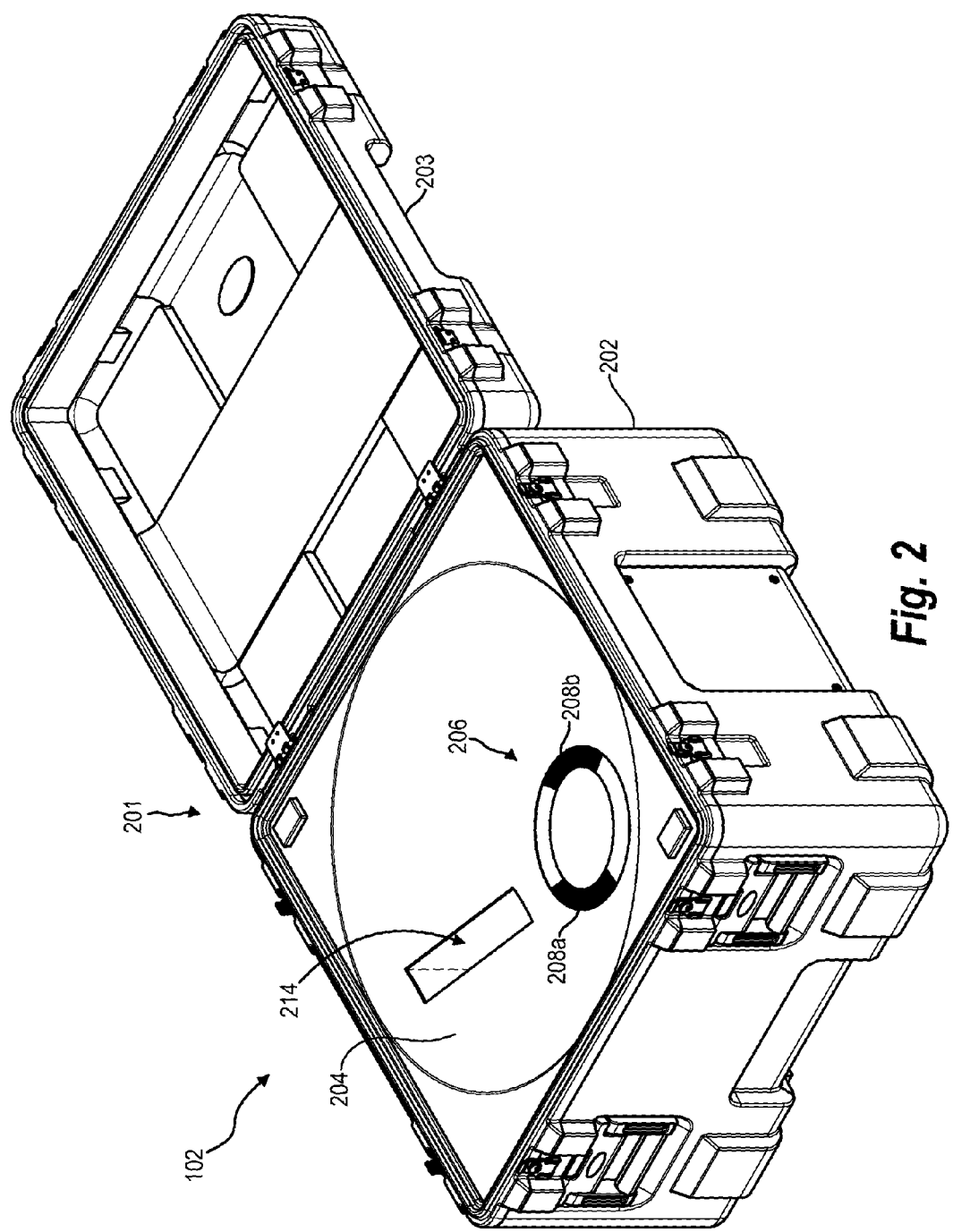
FIG. 2 illustrates a side-perspective view of an example unmanned aerial vehicle ground station in accordance with one or more embodiments.
Figure 3:
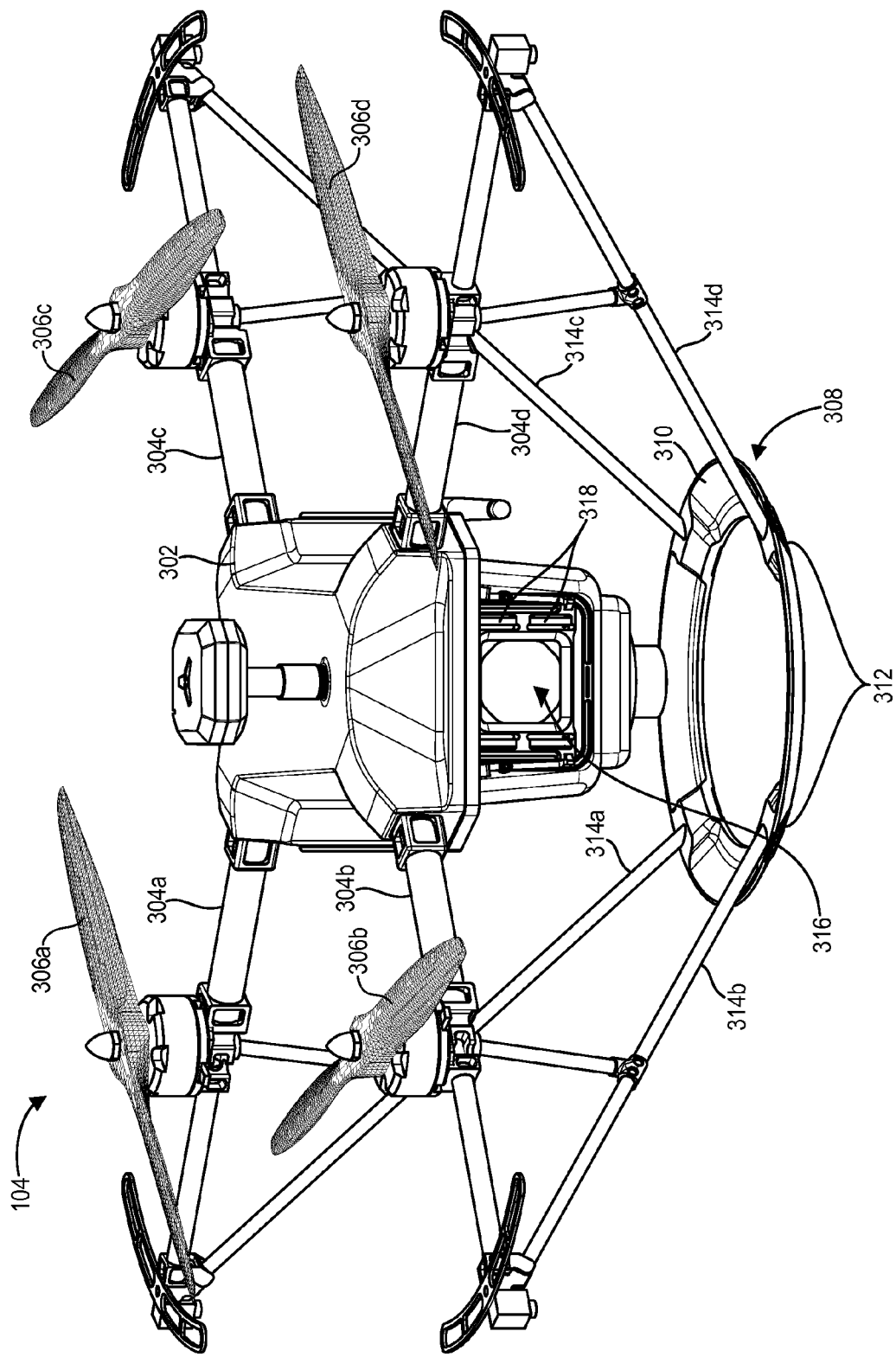
FIG. 3 illustrates a side-perspective view of an example unmanned aerial vehicle in accordance with one or more embodiments.

FIGS. 2 and 3 illustrate perspective views of a UAVGS 102 and a UAV 104, respectively. For example, as shown in FIG. 2, the UAVGS 102 includes a housing 201 including a base 202 and a hinged lid 203. In one or more embodiments, the hinged lid 203 can secure to the base 202 via one or more latches. Additionally, the hinged lid 203 may be removable from the base 202 of the housing 201. For example, the lid 203 of the housing 201 may remove from the base 202 when opening the UAVGS 102 in order to minimize any possible interference with the UAV 104 during an autonomous landing of the UAV 104 within the UAVGS 102. Alternatively, or additionally, the lid 203 of the housing 201 may be removed from the base 202 of the housing 201 in order to prevent the UAVGS 102 from blowing over in the wind.

Moreover, while not shown in FIG. 2, the lid 203 of the housing 201 can include a non-hinged lid that covers components within the housing 201. For example, the lid 203 may include a retractable cover that opens to provide access to the landing housing 204 and closes when the UAVGS 102 is not in use or while the UAV 104 is landed within the UAVGS 102. Additionally, in one or more embodiments, the lid 203 include one or more electronic components that enable the lid 203 to open and close in response to receiving an input. As an example, where the sensor manager 112 of the UAVGS controller 106 determines that it is raining, the sensor manager 112 can provide an input to the lid 203 to close and cover components within the housing 201. Alternatively, the lid 203 can close in response to receiving a user input.

Additionally, as illustrated in FIG. 2, the UAVGS 102 includes a landing housing 204. As shown in FIG. 2, the landing housing 204 includes an opening toward a top surface of the base 201 and a floor 206 of the landing housing 204 toward a bottom surface of the base 201. Further, as shown in FIG. 2, the landing housing 204 has a shape that extends downward and inward from the opening of the landing housing 204 at the top of the base 202 toward the floor 206. In one or more embodiments, the UAVGS 102 includes a single landing housing 204 shaped to receive a single UAV 104 within the UAVGS 102. Alternatively, the UAVGS 102 can include multiple landing housings 204 having similar or different shapes and sizes.

In one or more embodiments, the UAVGS 102 includes a landing housing 204 having a conical shape that receives a UAV 104 within the housing 202 of the UAVGS 102. Additionally, as shown in FIG. 2, the landing housing 204 includes an outer wall that slants downward and inward from the opening of the landing housing 204 to the floor 206 of the landing housing 204. In one or more embodiments, the landing housing 204 gradually becomes narrower from the opening of the landing housing 204 to the floor 206 of the landing housing 204. As a result, a top-down cross section of the opening of the landing housing 204 has a larger area than a top-down cross section of the floor 206 of the landing housing 204. Additionally, while FIG. 2 illustrates one embodiment of the landing housing 204 having a conical shape, it is appreciated that the landing housing 204 can include other shapes. For example, rather than a conical shape, the landing housing 204 can have a pyramid shape or other angular shape that slants downward and inward from the opening of the landing housing 204 to the floor 206 of the landing housing 204.

Additionally, the landing housing 204 can have a shape that centers around a central axis that extends vertically through the base 202 of the housing 201. For example, as shown in FIG. 2, the landing housing 204 can have a conical shape that is centered around a central axis. Further, while not explicitly shown in FIG. 2, the landing housing 204 can include any symmetrical shape that is positioned around a central axis. For instance, the landing housing 204 can have a cubic pyramid shape (or other symmetrical shape) that centers around a central axis.

Furthermore, as shown in FIG. 2 and as mentioned above, the landing housing 204 includes an inner wall that slants linearly from the opening of the landing housing 204 to the floor 206 of the landing housing 204. As such, the inner wall of the landing housing 204 can have a uniform slope between the opening of the landing housing 204 and the floor 206 of the landing housing 204. Alternatively, in one or more embodiments, the inner wall(s) of the landing housing 204 has a non-linear slope extending from the opening of the landing housing 204 toward the floor 206 of the landing housing 204. For example, in one or more embodiments, the landing housing 204 can have a bowl or crater shape having an inner wall with a higher slope towards the opening of the landing housing 204 than a slope towards a bottom portion (e.g., the floor 206) of the landing housing 204.

Additionally, as will be described in additional detail below, one or more embodiments of the landing housing 204 has a shape that enables an incoming UAV 104 to self-align within the landing housing 204. For example, when a UAV 104 initially comes into contact with any part of the landing housing 204, the slope of the inner walls of the landing housing 204 may cause the UAV 104 to gradually self-align within the landing housing 204 as the UAV 104 moves towards the floor 206 of the landing housing 204. Additionally, where the landing housing 204 has a complimentary shape or otherwise corresponds to a shape of the portion of the UAV 104 that fits within the landing housing 204, the UAV 104 can fall into place and self-align within the landing housing 204 from any horizontal direction with respect to the landing housing 204 as the UAV 104 comes into contact with and lands within the landing housing 204 of the UAVGS 102.

As shown in FIG. 2, the floor 206 of the landing housing 204 includes one or more UAVGS charging contacts 208a-b. In particular, the floor 206 of the landing housing 204 includes a first UAVGS charging contact 208a and a second UAVGS charging contact 208b. In one or more embodiments, the first UAVGS charging contact 208a and the second UAVGS charging contact 208b extend around a perimeter of the floor 206 of the landing housing 204. Additionally, in one or more embodiments, the floor 206 of the landing housing 204 includes one or more non-conductive portions 212 that separate the UAVGS charging contacts 208a-b and extend around a portion of the floor 206 of the landing housing 204. For example, as shown in FIG. 2, the floor 206 includes a first UAVGS charging contact 208a and a second UAVGS charging contact 208b separated by two non-conductive portions of the floor 206.

While FIG. 2 illustrates one embodiment of two UAVGS charging contacts 208a-b positioned around a perimeter of the floor 206 of the landing housing 204, the landing housing 204 can include various arrangements of the UAVGS charging contacts 208. For example, the landing housing 204 may include fewer or additional UAVGS charging contacts 208. Additionally, the floor 206 of the landing housing 204 can include alternative arrangements of the two contacts 208a-b than the arrangement illustrated in FIG. 2. In still further embodiment, the UAVGS landing housing 204 can be devoid of charging contacts, such as in the case in which a UAV uses only replaceable batteries.

Additionally, as mentioned above, and as shown in FIG. 2, the UAVGS 102 can include a battery slot 214 that stores one or more replaceable batteries. In particular, the battery slot 214 can house a replaceable battery within a battery assembly so that the UAVGS 102 can insert or remove from a similarly sized receiving slot within a UAV 104. For example, in one or more embodiments, the UAVGS 102 includes a battery arm capable of removing a battery from within a UAV 104 and placing the battery within the battery slot 214 of the UAVGS 102. Additionally, the battery arm can remove the battery from the battery slot 214 (e.g., after the UAVGS 102 charges the battery) and place the battery within a receiving slot of a UAV 104. While FIG. 2 illustrates a UAVGS 102 including a single battery slot 214, it is appreciated that the UAVGS 102 can include any number of battery slots 214.

In one or more embodiments, the UAVGS 102 can include a carousel feature that enables the landing housing 204, battery slot 214 and/or UAV 104 to rotate within the base 202 of the UAVGS 102. For example, while not shown in FIG. 2, the UAVGS 102 can include a motor or other component positioned under the landing housing 204 that causes the landing housing 204, battery slot 214, and/or UAV 104 to rotate with respect to a battery arm and enable the battery arm to remove a battery from the UAV 104 and replace the battery with a new battery. Additionally, the carousel or other rotational component can cause a replacement battery within the UAVGS 102 to align with respect to the battery arm and/or UAV 102 and enable the battery arm to insert a replacement battery within the UAV 104.

Additionally, the UAVGS 102 can include one or more engagement points within the UAVGS 102 that secure the UAV 104 in place within the landing housing 204 of the UAVGS 102. In particular, the UAVGS 102 can include one or more components that hold, fasten, or otherwise secure the UAV 104 within the landing housing 204. As an example, the UAVGS 102 can include one or more magnets, grooves, rails, or various mechanical components included within the UAVGS 102 that secure the UAV 104 in place within the UAVGS 102. Alternatively, in one or more embodiments, the UAV 104 can include one or more components that secure the UAV 104 within the landing housing 204 of the UAVGS 102.

FIG. 3 illustrates an example UAV 104 that lands within a UAVGS 102 in accordance with one or more embodiments described herein. As shown, the UAV 104 can include a main body 302 coupled to a plurality of rotor arms 304a-d that each supports a respective rotor 306a-d. It will be understood that by varying the pitch and speed of the rotors 306a-d, the flight manager 126 can control the speed, direction, and altitude of the UAV 104. For example, as discussed above, the rotor controller 128 can control the pitch and speed of the rotors 306a-d in order to move the UAV 104 within a three-dimensional space. In additional or alternative embodiments, the UAV 104 may include fewer or more rotor arms and rotors, depending on various factors such as the weight of the UAV 104. Additionally, as discussed above, the UAV 104 can include a computing device, such as described below with reference to FIG. 10, to use for controlling the UAV based on input provided from one or more sensors.

As illustrated in FIG. 3, the UAV 104 includes a landing base 308 coupled to the main body 302 of the UAV 104. In particular, in one or more embodiments, the landing base 308 is connected to and positioned below the main body 302 of the UAV 104. As shown in FIG. 3, the landing base 308 includes a landing pad 310, a plurality of charging contacts 312 on an underside of the landing base 308, and a landing frame including one or more legs 314a-d.

In one or more embodiments, the landing pad 310 comprises a symmetrically-shaped ring positioned around a central axis that passes through the middle of the UAV 104. In particular, the landing pad 310 can extend around a central axis that passes through the middle of the main body 302 or a center of gravity of the UAV 104. The shape of the landing pad 310 can allow a camera to have a free line of sight through the landing base. For example, as shown by FIG. 3, the UAV 104 can include a camera with a line of sight aimed through the circular ring of the landing base 310. One will appreciate that the landing base 308 can surround the camera. Thus, the landing base 308 can protect the camera from being contacted or damaged during flight, landing, and takeoff.

Additionally, while FIG. 3 illustrates one embodiment in which the landing pad 310 is a circular landing ring, the landing pad 310 may have alternative shapes extending around a central axis of the UAV 104. For example, the landing pad 310 can have a circular, square, or other symmetrical shape positioned around a central axis of the UAV 104. Alternatively, the landing pad 310 may include a non-symmetrically shaped landing pad 310 positioned around the central axis such as a triangle, rectangle, pentagon, or other shape. In one or more embodiments, the shape and size of the landing pad 310 corresponds to the shape and size of the floor 206 of the landing housing 204 of the UAVGS 102.

In addition, as will be described in greater detail below, a bottom portion of the landing pad 310 can include a plurality of charging contacts positioned about the landing pad 310. In particular, as shown in FIG. 3, the landing base 308 can include a plurality of UAV charging contacts 312 connected to a bottom surface of the landing pad 310. Alternatively, in one or more embodiments, the UAV charging contacts 312 can extend beyond the bottom surface of the landing pad 310. For example, the UAV charging contacts 312 can extend further inward and downward around the ventral axis of the UAV 104 from the landing pad 310.

As mentioned above, the landing base 308 can couple to the main body 302. In particular, as illustrated in FIG. 3, the UAV 104 includes a landing frame having a plurality of legs 314a-d that couple to the main body 302 of the UAV 104. Additionally, each of the legs 314a-d can couple the landing pad 310 to respective rotors 306a-d. As shown in FIG. 3, one or more embodiments of the landing frame can include individual legs 314a-d that each couple the landing pad 310 to a respective rotor 306a-d. It is appreciated that the landing frame can include any number of legs 314 coupled to any number of rotors 306. Alternatively, in one or more embodiments, the landing frame can include a single leg or single structure that extends around the landing base 308 (e.g., around a central axis of the UAV 104) and couples the landing pad 310 to each of multiple rotors 306a-d. For example, one or more embodiments of the landing frame can include an outer shell that extends around the central axis of the UAV 104.

In one or more embodiments, a shape of the landing frame can correspond to a shape of a landing housing 204 of the UAVGS 102. For example, as shown in FIG. 3, the legs 314a-d of the landing frame can extend downward and inward from the main body 302 toward the landing pad 310 of the UAV 104. As such, the landing frame can form a complimentary shape to a landing housing 204 having a conical, cubic pyramid, or other shape within which the legs 314a-d of the landing frame and the landing base 308 can fit within when the UAV 104 lands within the UAVGS 102. Alternatively, in one or more embodiments, the landing frame can have other shapes corresponding to a shape of a landing housing 204 of the UAVGS 102.

Furthermore as shown by FIG. 3, the legs 314a-d of the landing frame can extend radially outward beyond the rotors 306a-306d. One will appreciate in light of the disclosure herein that by radially extending beyond the rotors 306a-306d, the legs 314a-b can prevent or reduce contact between the rotors 306a-306d and the ground station. Thus, the conical shape of the landing base 308 can both help self align the UAV as the UAV lands as well as protect the rotors 306a-306d from damage during landing.

In addition to providing a structural shape for the UAV 104, the legs 314a-d of the landing frame can also provide electrical conduits between the UAV charging contacts 312 and one or more electrical components of the UAV 104. For example, in one or more embodiments, the legs 314a-d electrically couple the UAV charging contacts 312 to a battery assembly 316 on board the UAV 104. Additionally or alternatively, the legs 314a-d can electrically couple the UAV charging contacts 312 to one or more of the electrical systems (e.g., motors) that drive the rotors 306a-d. As such, when an electrical signal (e.g., a power signal) is applied to one or more of the contacts 312, the legs 314a-d can route the electrical signal to one or more electrical components of the UAV 104.

As mentioned above, the UAV 104 includes a battery 116. In one or more embodiments, the battery 116 provides power functionality to the UAV 104. For example, the battery 116 can include one or more power contacts that couple to various components of the UAV 104 and provide battery power throughout the UAV 104. For instance, the battery 116 can provide a power signal to the rotors 306a-d and power flight of the UAV 104. Further, the battery 116 can provide power to a camera, a processor, and other electrical components on the UAV 104.

Additionally, in one or more embodiments, the battery 116 can provide data functionality to the UAV 104. For example, in addition to the power contact(s), the battery 116 can include one or more data contacts that couple to an SD card, hard drive, or other storage component on the UAV 104 and/or on the battery itself. As such, the battery 116 can provide both power and data functionality to the UAV 104. Additionally, where the battery 116 includes storage components (e.g., SD card, hard drive) on board the battery 116, the data components may be swapped out when the battery 316 is removed and replaced. As such, a user or battery arm can swap out both the battery and data storage for the UAV 104 in a single battery replacement process.

Each of the power and/or data contacts can couple to one or more UAV charging contacts 312. As such, a power signal can be routed between the UAV charging contacts 312 and power contacts on the battery 316. Additionally, a data signal or communication signal can be routed between the UAV charging contacts 312 and a data contact on the battery 316. In one or more embodiments, power contacts and data contacts on the battery 316 correspond to different UAV charging contacts 312. For example, a first group of the charging contacts 312 can couple to one or more power contacts of the battery 316 while a second group of the charging contacts 312 can couple to one or more data contacts on the battery 316. Additionally, when the UAV 104 is landed within the UAVGS 102 and the UAV charging contacts 312 electrically couple to corresponding UAVGS charging contacts 308, the UAVGS 102 and/or UAV 104 can charge the battery 316 using a power signal as well as communicate data using a data signal.

As mentioned above, the UAV 104 can land within the UAVGS 102. In particular, when landing, the landing base 308 and/or landing frame can make contact with a portion of the landing housing 204 of the UAVGS 102 and cause the UAV 104 to self-align within the UAVGS 102. As an example, FIGS. 4A-4B illustrates a UAV 104 landing within the UAVGS 102 in accordance with one or more embodiments.

Figure 4A:
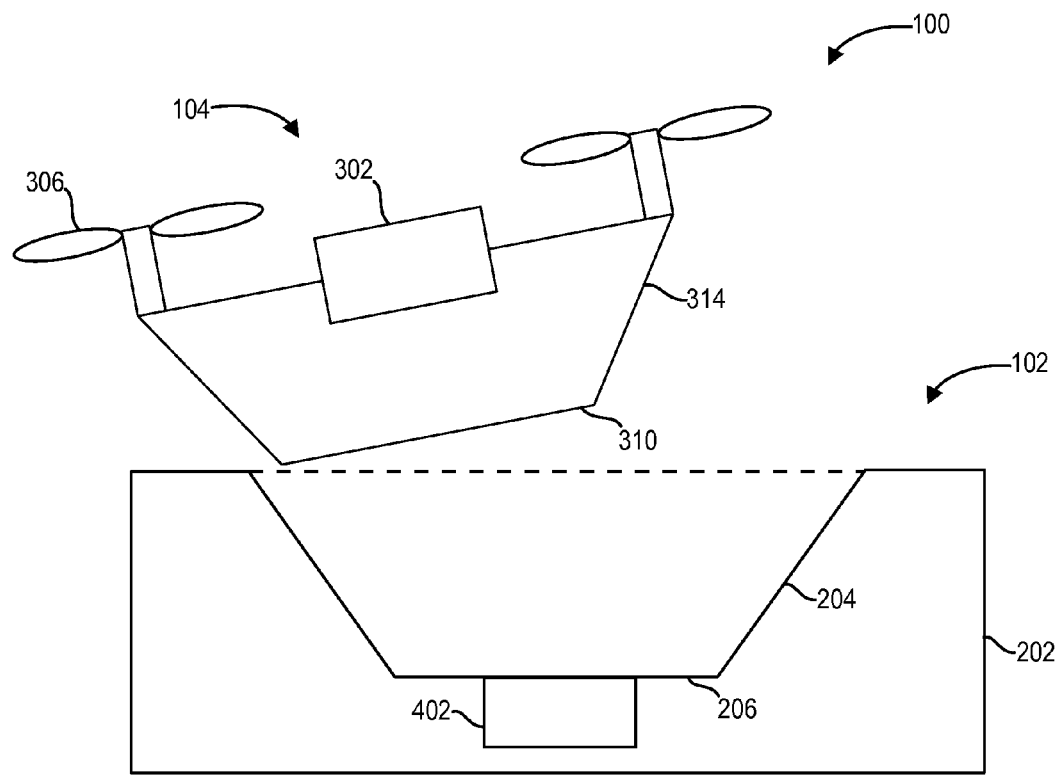
FIGS. 4A-4E illustrate views of an example autonomous landing in accordance with one or more embodiments.
Figure 4B:
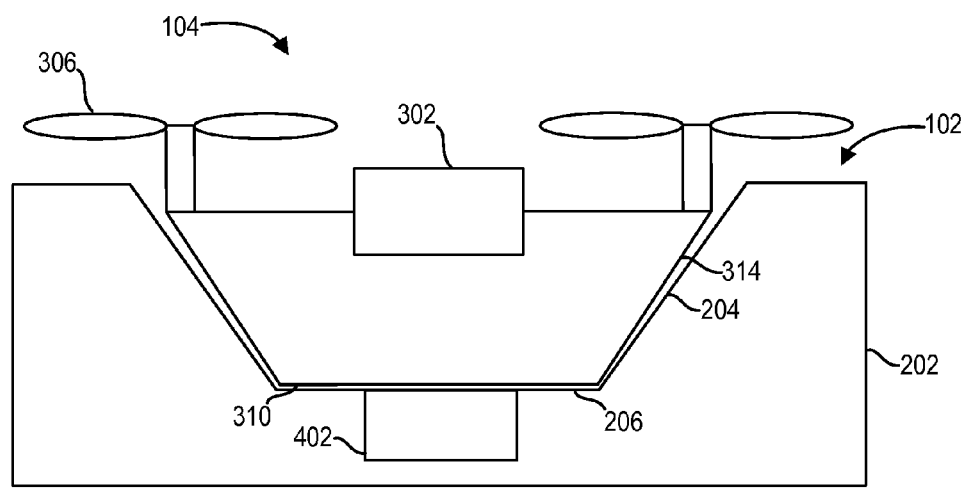

In particular, FIG. 4A illustrates the UAV 104 approaching the UAVGS 102 prior to the leg(s) 314 of the landing frame and/or the landing base 308 making contact with the landing housing 204 of the UAVGS 102. In particular, FIG. 4A shows the UAV 104 approaching the UAVGS 102 from above the UAVGS 102. In particular, as described above, the flight manager 126 of the UAV 104 can cause the UAV 104 to fly within a space above the opening of the landing housing 204. The flight manager 126 can then cause the UAV 104 to descend within the landing housing 204.

In one or more embodiments, the flight manager 126 guides the UAV 104 within a space above the opening of the landing housing 204, but fails to align the landing pad 310 of the UAV 104 exactly above the floor 206 of the UAVGS 102. Additionally, as shown in FIG. 4A, the UAV 104 can approach the UAVGS 102 at a tilt rather than at a precise horizontal angle relative to the UAVGS 102. The imprecise alignment and tilt of the UAV 103 can be caused by a variety of factors including, but not limited to, inexact measurement of sensors, environmental factors (e.g., wind), operational error, and other contributing factors that affect the position and angle of the UAV 104 relative to the UAVGS 102 prior to successfully docking within the UAVGS 102.

Notwithstanding inexact alignment and tilt of the UAV 104 as the UAV 104 approaches the UAVGS 102, the shape of the landing housing 204 as well as the shape of the UAV 104 can compensate for inexact alignment and tilt between the UAV 104 and the UAVGS 102. For example, as shown in FIGS. 4A-4B, the landing housing 204 can slant inward from the opening at the top of the UAVGS 102 towards the floor 206 towards the bottom of the UAVGS 102. As such, when any part of the UAV 104 landing base comes into contact with the landing housing 204, the UAV 104 may self-align within the landing housing 204 as the UAV 102 continues to descend. In one or more embodiments, the shape of the landing housing 204 and/or shape of the landing frame of the UAV 104 can enable the UAV 104 to self-align so long as the landing pad 310 is the opening of the landing housing 204 and the UAV 104 is tilted at less than a threshold angle.

For example, as shown in FIG. 4B, the UAV 104 can continue to descend within the landing housing 204 and self-align within the UAVGS 102 such that the landing pad 310 of the UAV 104 comes into contact with the floor 206 of the UAVGS 102. Additionally, as shown in FIG. 4B, the tilt of the UAV 104 can self correct as the UAV 102 comes into contact with the landing housing 204 of the UAVGS 102 and comes to rest on the floor 206 of the landing housing 204. In one or more embodiments, the UAV 104 gradually or incrementally self-aligns as the UAV 104 progresses down the outer wall of the landing housing 204 and approaches the floor 206 of the landing housing 204.

Further, as shown in FIG. 4A-4B, one or more embodiments of the UAVGS 102 can include a carousel 402 that causes one or more components of the autonomous landing system to rotate. For example, the carousel 402 can cause the landing housing 204, the floor 206, and/or the UAV 104 to rotate and cause the UAV 104 to rotationally align within the landing housing 204. In particular, the carousel 402 can cause the UAV 104 to align with respect to a battery arm that grips a battery 316 (shown in FIG. 3) by one or more handles 318 (shown in FIG. 3) to remove and/or insert the battery 316 within a battery slot on the UAV 104. For example, where the battery arm has limited rotational capabilities (e.g., within a confined space of the UAVGS 102), the carousel 402 can align the battery 316 of the UAV 104 within a range of the battery arm within the UAVGS 102. Additionally or alternatively, in one or more embodiments, the carousel 402 can cause the UAV 104 to rotationally align with respect to electronic contacts between the UAV 104 and UAVGS 102. Further, the battery arm can remove and/or insert the battery 316 by gripping one or more handles 318 shaped to receive the battery arm and which enable the battery arm of the UAVGS 102 to remove and/or insert the battery 316 within the UAV 104.

Figure 4C:
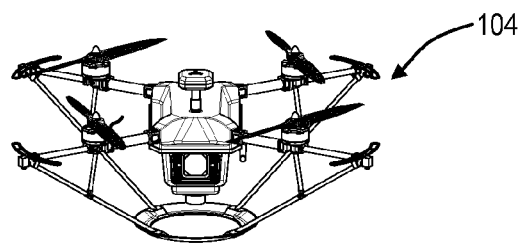
Figure 4D:
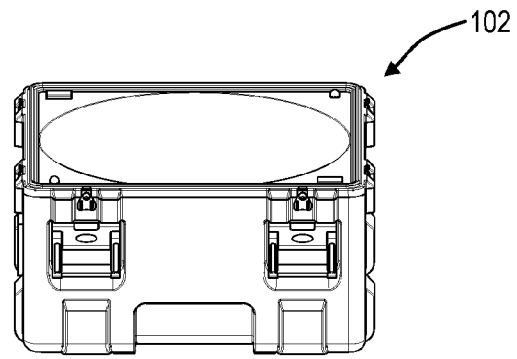
Figure 4D:
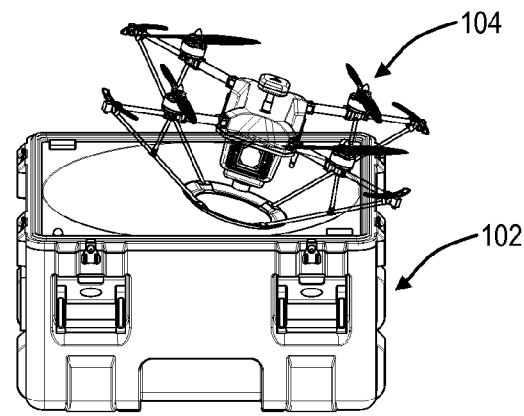
Figure 4E:
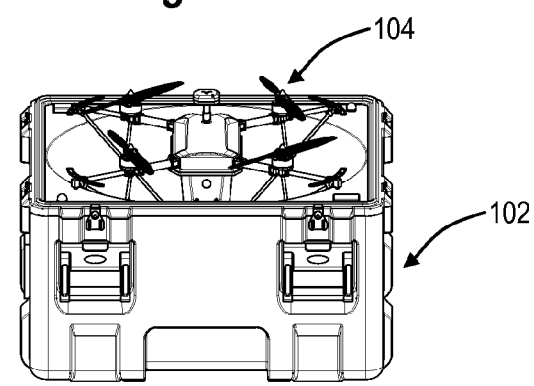

FIGS. 4C-4E are similar to FIGS. 4A-4B, albeit that they depict a detailed embodiment of the UAV 104 and UAVGS 102 rather than a schematic representation. As shown by FIGS. 4C and 4D, as the UAV 104 descends into the UAVGS 102, the UAV 104 may tilt, rotate, or otherwise deviate from an ideal landing path relative to the UAVGS 102. For example, wind, incorrect sensor readings, a rotor failure or other causes can cause the UAV to misalign with the UAVGS 102 during landing.

Notwithstanding inexact alignment and tilt of the UAV 104 as the UAV 104 approaches the UAVGS 102, the shape of the landing housing as well as the shape of the UAV 104 can compensate for inexact alignment and tilt between the UAV 104 and the UAVGS 102. As such, when any part of the UAV 104 landing base comes into contact with the landing housing, the UAV 104 may self-align within the landing housing as the UAV 102 continues to descend.

For example, as shown in FIG. 4D, the UAV 104 can continue to descend within the landing housing and self-align within the UAVGS 102 such that the landing pad of the UAV 104 comes into contact with the floor of the UAVGS 102. Additionally, as shown in FIG. 4E, the tilt of the UAV 104 can self correct as the UAV 102 comes into contact with the landing housing of the UAVGS 102 and comes to rest on the floor of the landing housing. In one or more embodiments, the UAV 104 gradually or incrementally self-aligns as the UAV 104 progresses down the outer wall of the landing housing and approaches the floor of the landing housing of the UAVGS 102.

In addition to causing the UAV 104 to align a vertical position and tilt of the UAV 104 with respect to the floor 206 of the landing housing 204, one or more embodiments of the autonomous landing system 100 can cause one or more UAV charging contacts 312 to align with and couple to respective UAVGS charging contacts 208a-b on the floor 206 of the landing housing 204. In particular, in one or more embodiments, the UAV charging contacts 312 come into contact with and electrically connect to one or more UAVGS charging contacts 208a-b when the UAV 104 lands within the landing housing 204 of the UAVGS 102. Coupling the UAVGS charging contacts 208a-b to the UAV charging contacts 312 can facilitate an electrical connection between the UAVGS 102 and the UAV 104.

As mentioned above, the landing base 308 of the UAV 104 can include a plurality of UAV charging contacts 312 on an underside of the landing pad 310 that electrically couple to UAVGS charging contacts 208a-b on the floor 206 of the landing housing 204. When the UAV 104 lands within the UAVGS 102, the UAVGS charging contacts 208a-b can electrically couple to the UAV charging contacts 312 and provide various functionalities to the autonomous landing system 100. For example, when the UAVGS charging contacts 208a-b are coupled to the UAV charging contacts 312, the UAVGS 102 and the UAV 104 can communicate data, provide a power signal to the UAV 104, provide auxiliary power to the UAV 104, and/or charge a battery on board the UAV 104.

In particular, as mentioned above, the UAV 104 can include a battery 316 within the main housing 302 of the UAV 104. Additionally, as discussed above, the UAV charging contacts 312 can be electrically coupled to the battery 316 within the main housing 302 (e.g., via one or more legs 314a-d of the landing frame). When the UAV charging contacts 312 electrically couple to the UAV charging contacts 208, the UAVGS 102 can provide a power signal (e.g., a charging signal) to the battery via the UAV charging contacts 312 and charge the battery 316 while the UAV 104 is docked within the landing housing 204 of the UAVGS 102. The UAV 104 can continue to charge so long as the UAV 104 is landed within the UAVGS 102.

Figure 5:
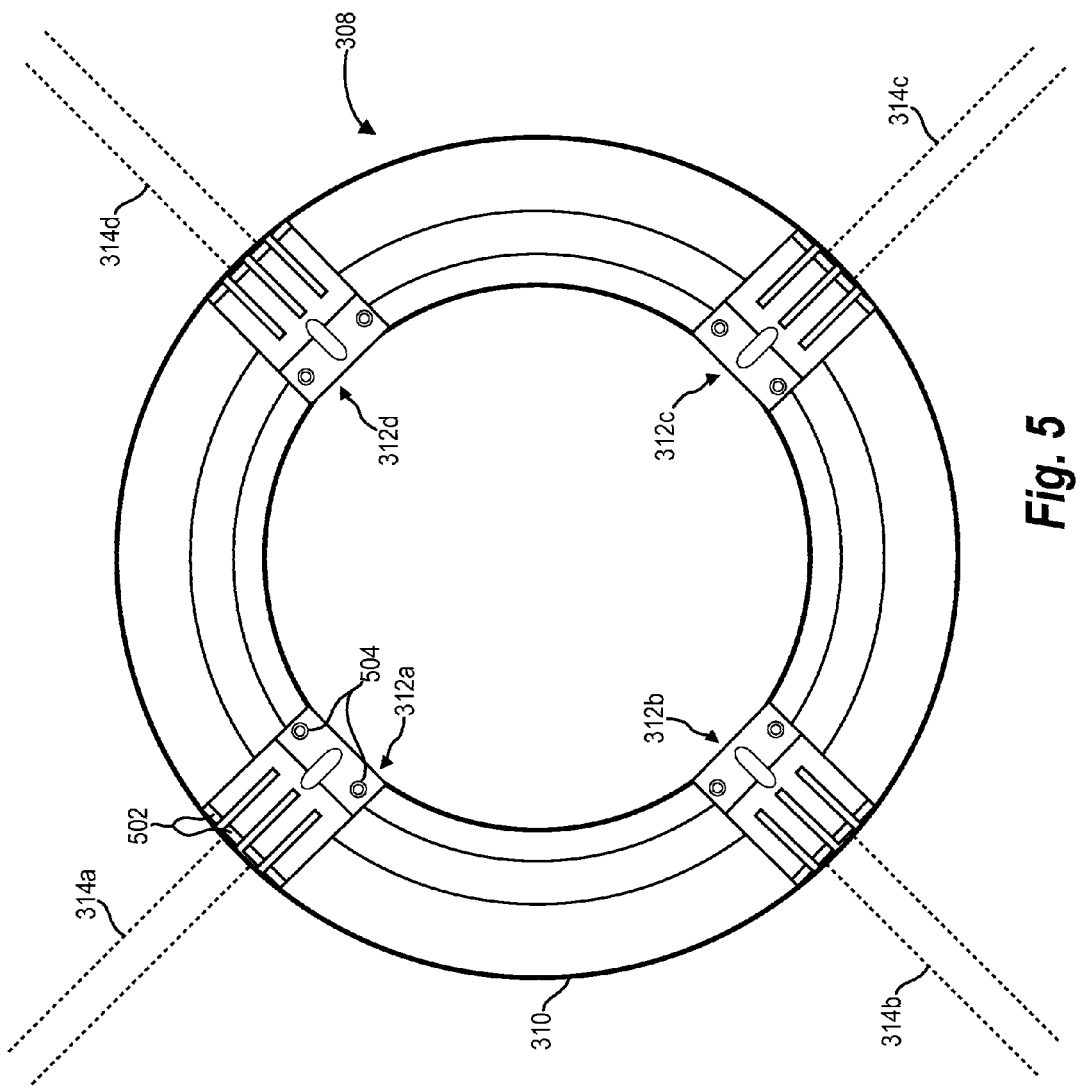
FIG. 5 illustrates a bottom-perspective view of an example landing base of a UAV in accordance with one or more embodiments.

In one or more embodiments, the UAV charging contacts 312 and UAVGS charging contacts 208a-b can have features that facilitate a reliable connection between the UAV 104 and the UAVGS 102. For example, FIG. 5 illustrates an example arrangement of UAV charging contacts 312a-d on an underside of a landing pad 310 of a landing base 308 on the UAV 104. In particular, FIG. 5 illustrates a bottom view of the landing base 308 described above in connection with FIG. 2.

As shown in FIG. 5, the landing base 308 can include a landing pad 310 that forms a circular ring. As mentioned above, the landing pad 310 can come into contact with and rest on a similarly shaped floor 206 of the UAVGS 102. In one or more embodiments, the shape of the landing pad 310 corresponds to the shape of the floor 206 of the UAVGS 102. For example, where the landing pad 310 forms a circular ring having a diameter that extends between two outer edges of the landing pad 310, the floor 206 of the UAVGS 102 can similarly form a circular surface area having the same diameter and within which the landing pad 310 fits when the UAV 104 lands within the UAVGS 102. It is appreciated that the landing pad 308 can have different shapes or sizes that correspond to or otherwise fit within the floor 206 of the UAVGS 102.

Additionally, as shown in FIG. 5, the landing base 308 can include a plurality of UAV charging contacts 312a-d positioned on the underside of the landing pad 310. For example, the landing base 308 can include four UAV charging contacts 312a-d corresponding to respective legs 314a-d of a landing frame of the UAV 104. In one or more embodiments, the landing base 308 includes one UAV charging contact 312 for each leg 314 of the landing frame. Alternatively, the landing base 308 can include additional or fewer UAV charging contacts 312 than a number of legs 314 of the landing frame.

As shown in FIG. 5, the UAV charging contacts 312 include one or more tabs 502. In one or more embodiments, the tabs 502 can include electrically conductive metal tabs that come into contact with and establish with a corresponding UAVGS charging contact 208a, b on the UAVGS 102. Additionally, the tabs can provide spring between the UAV 104 and the UAVGS 102 that facilitates a more reliable connection between the UAV charging contacts 312a-d and corresponding UAVGS charging contacts 208a-b. Additionally, as shown in FIG. 5, the UAV charging contacts 312a-d include securing points 504 between each of the UAV charging contacts 312a-d and the landing pad 310. For example, as shown in FIG. 5, each of the UAV charging contacts 312a-d include two securing points 504 that fasten the UAV charging contacts 312a-d in place relative to the landing pad 310 of the landing base 308.

In one or more embodiments, each of the UAV charging contacts 312a-d are electrically coupled to a battery system within the main housing 302 of the UAV 104. For example, one or more of the UAV charging contacts 312a-d may be coupled to a respective node of a battery system. In one or more embodiments, each UAV charging contact 312a-d is coupled to a different electrical node within the UAV 104. As an example, a first UAV charging contact 312a can couple to a positive node of a battery 316 while a second UAV charging contact 312b couples to a negative node of the battery 316. Further, a third UAV charging contact 312c and fourth UAV charging contact 312d can couple to a different component within the UAV 104 (e.g., motors, printed circuit board, etc.) As an alternative, one or more UAV charging contacts 312a-d can couple to a first node within the UAV 104 while one or more UAV charging contacts 312a-d can couple to a second node within the UAV 104. For example, in one or more embodiments, the first UAV charging contact 312a and the second UAV charging contact 312b electrically couple to a positive node of the battery 316 while the third UAV charging contact 312c and the fourth UAV charging contact 312d electrically couple to a negative node of the battery 316.

In one or more embodiments, an arrangement of the UAV charging contacts 312a-d can ensure a reliable connection between the UAV charging contacts 312a-d and one or more UAVGS charging contacts 208a-b on the floor 206 of the landing housing 204 within the UAVGS 102. For example, as shown in FIG. 5, the UAV charging contacts 312a-d can be spaced apart around the landing base 310. Spacing apart the UAV charging contacts 312a-d can ensure that at least one of the UAV charging contacts 312a-d electrically couples to a first UAVGS charging contact 308a and at least one additional UAV charging contact 312a-d electrically couples to a second UAV charging contact 308b. As such, when the UAV 104 comes into contact with the landing housing 204 and the landing base 308 comes into contact with the floor 206 of the landing housing 204, the UAV charging contacts 312a-d can establish an electrical connection with each of the UAV charging contacts 208a-b.

In addition to ensuring that the UAV charging contacts 312a-d couple with the UAV charging contacts 208, the arrangement of the UAV charging contacts 312a-d can further ensure that a particular pairing of UAV charging contacts 312a-d couples with respective UAV charging contacts 208a-b on the floor 206 of the landing housing 204. For example, where the first and second UAV charging contacts 312a-b (e.g., a first group of charging contacts on the UAV) are coupled to a positive node of the battery 316 and the third and fourth UAV charging contacts 312c-d (e.g., a second group of charging contacts on the UAV) are coupled to a negative node of the battery 316, the first pair of UAV charging contacts 312a-b and the second pair of UAV charging contacts 312c-d can couple to different UAV charging contacts 208a-b no matter what rotational angle the UAV 104 comes into contact with the UAVGS 102. As such, an arrangement of the UAV charging contacts 312a-d can ensure that neither of the first pair of UAV charging contacts 312a-b will couple to the same UAV charging contact 208 as either of the second pair of UAV charging contacts 312c-d.

In addition to the UAV charging contacts 312a-d, the floor 206 of the UAVGS 102 can have an arrangement of charging contacts 208a-b and non-conductive areas 212 that facilitate a reliable connection between the UAV 104 and the UAVGS 102 when the UAV 104 lands within the UAVGS 102. For example, as shown in FIG. 2, the floor 206 of the landing housing 204 can include a first UAV charging contact 208a on a first side of the floor 206 as well as a second UAV charging contact 208b on a second (e.g., opposite) side of the floor 206. Additionally, the floor 206 of the landing housing 204 can include a non-conductive area 212 that separates the first UAV charging contact 208a and the second UAV charging contact 208b such that none of the UAV charging contacts 312a-d will establish an electrical connection with both the first UAV charging contact 208a and the second UAV charging contact 208b.

In addition to ensuring that only a single connection exists between one or more of the UAV charging contacts 312a-d and one or more of the UAV charging contacts 208a-b (e.g., preventing a connection between a single UAV charging contact 312a-d and multiple UAV charging contacts 208a-b), the floor 206 of the landing housing 204 can further include an arrangement of UAV charging contacts 208a-b that prevents different pairings of the UAV charging contacts 312a-d from electrically coupling to the same UAV charging contact 208. For example, in cooperation with the arrangement of the UAV charging contacts 312a-d, the UAV charging contacts 208a-b can have a complementary arrangement around the floor 206 of the landing housing 204 that prevents the first UAV charging contact 312a and the second UAV charging contact 312b (e.g., a first group of charging contacts on the UAV) from electrically coupling to both the first UAV charging contact 208a and the second UAV charging contact 208b. Additionally, the UAV charging contacts 208a-b can have an arrangement around the floor 206 of the landing housing that prevents the third UAV charging contact 312c and the fourth UAV charging contact 312d (e.g., a second group of charging contacts on the UAV) from electrically coupling to both the first UAV charging contact 208a and the second UAV charging contact 208b. As such, the arrangement of both the UAV charging contacts 312a-d and the UAV charging contacts 208a-b can prevent short circuits or signal ambiguity between similar nodes within the UAV 104 when the UAV 104 lands and forms an electrical connection with the UAVGS 102.

While FIGS. 2-5 illustrate one example embodiment of an arrangement of four UAV charging contacts 312a-d and a corresponding arrangement of two UAV charging contacts 208a-b, it is appreciated that the UAV 104 and/or UAVGS 102 can have a different arrangement of contacts including more or less contacts as described with respect to FIGS. 2-5. For example, the UAV 104 can include additional UAV charging contacts 312 positioned around a landing base 308 corresponding to one or more additional UAVGS charging contacts 208a-b positioned on a floor 206 of the landing housing 204. In one or more embodiments, the autonomous landing system 100 can include a particular ratio of UAV charging contacts 312 to UAV charging contacts 208. For example, similar to the embodiments described in connection to FIGS. 2-5, the autonomous landing system 100 can have a 2:1 ratio of UAV charging contacts 312 to UAV charging contacts 208. More specifically, the autonomous landing system 100 can include any number of UAV charging contacts 312 and UAVGS charging contacts 208a-b having a 2:1 ratio. Alternative embodiments can include different ratios of UAV charging contacts 312 to UAV charging contacts 208, such as 4:1, 3:1, 3:2, etc.

Figure 6:
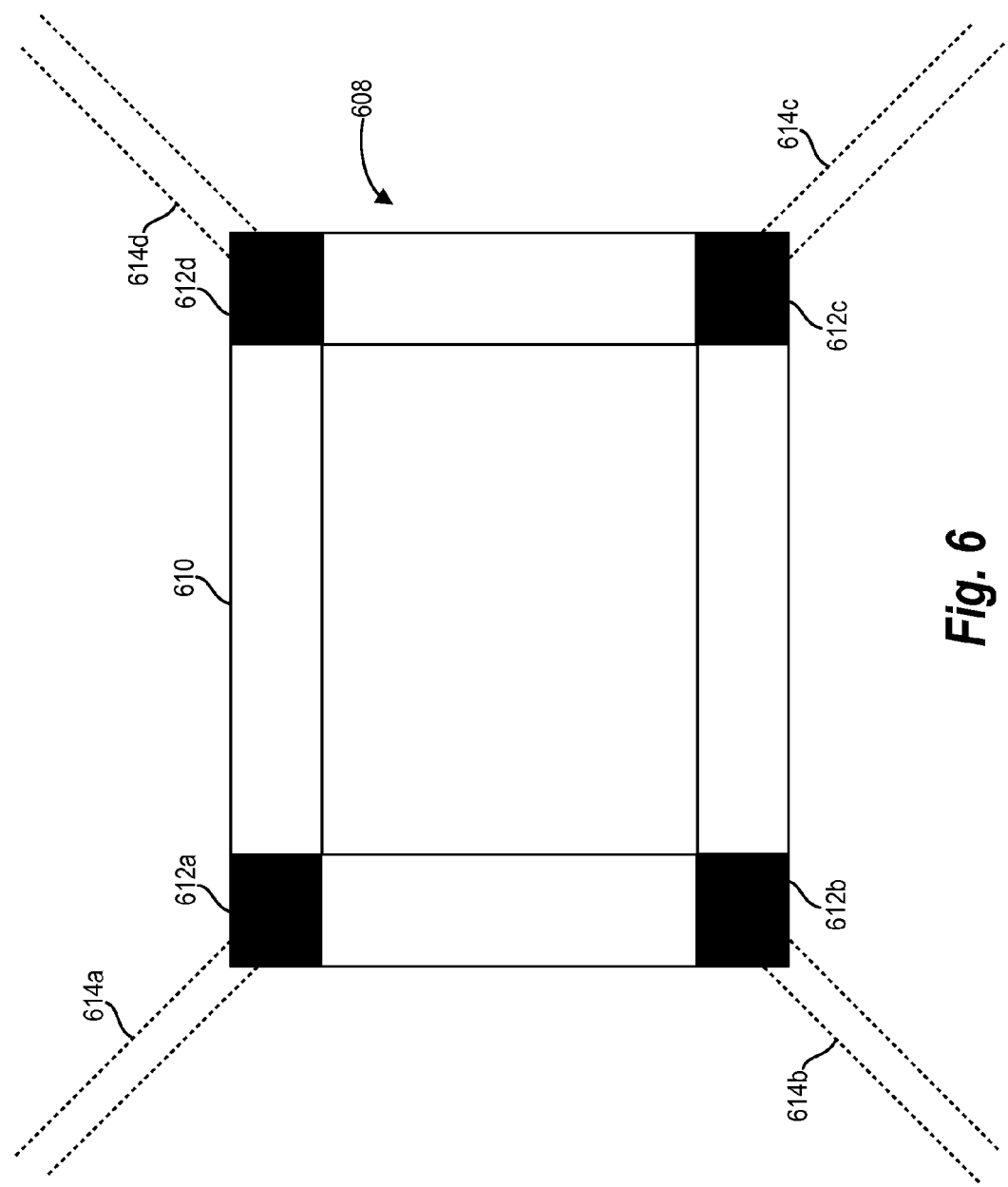
FIG. 6 illustrates a bottom-perspective view of another example landing base of a UAV in accordance with one or more embodiments.

As mentioned above, the landing base 204 of the UAV 104 can have a variety of shapes and arrangements of UAV charging contacts 312 on an underside of a landing pad 310. For example, FIG. 6 illustrates an example embodiment of a landing base 608 of a UAV. The landing base 608 can include similar features and functionality as the landing base 308 described above in connection with FIG. 3 and FIG. 5. For example, the landing base 608 can include a landing pad 610 and charging contacts on the UAV 612a-d positioned below a main body of a UAV. Additionally, the landing pad 610 may couple to the main body of the UAV via one or more legs 614a-d of a landing frame.

Additionally, as mentioned above, the landing pad 610 of the UAV can have different shapes other than the circular ring as described above. For example, as shown in FIG. 6, the landing pad 610 has a square shape with charging contacts on the UAV 612a-d positioned at each corner of the landing pad 610. Additionally, as shown in FIG. 6, the corners of the landing pad 610 can couple to legs 614a-d of a landing frame of the UAV.

Similar to the UAV charging contacts 312a-d described above in connection with FIG. 5, the charging contacts on the UAV 612a-d can couple to different nodes within a main housing of a UAV. For example, the first UAV charging contact 612a and the second UAV charging contact 612b (e.g., first group of charging contacts on the UAV) can couple to a positive node of a battery within the main housing of the UAV. Additionally, the third UAV charging contact 612c and the fourth UAV charging contact 612d (e.g., second group of charging contacts on the UAV) can couple to a negative node of the battery within the main housing of the UAV. Additionally, the charging contacts on the UAV 612a-d can have an arrangement that prevents one or more charging contacts on the UAV 612a-b from the first group of charging contacts on the UAV from coupling to the same UAV charging contact as one or more charging contacts on the UAV 612c-d from the second group of charging contacts on the UAV.

Figure 7:
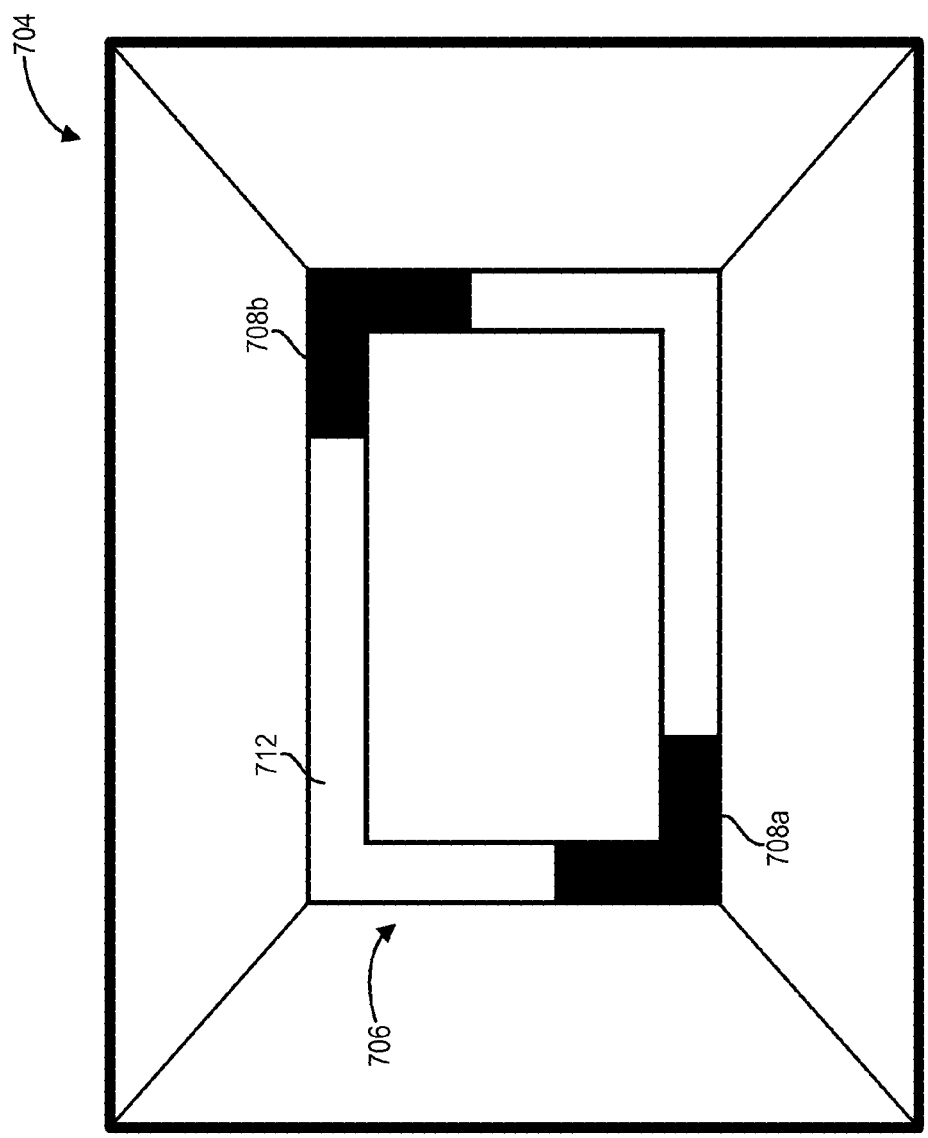
FIG. 7 illustrates a top-perspective view of a landing housing of a UAVGS in accordance with one or more embodiments.

FIG. 7 illustrates an example embodiment of a landing housing 704 of a UAVGS having similar features and functionality as corresponding features described above in connection with FIGS. 2-5. For example, FIG. 7 illustrates a landing housing 704 of a UAVGS that includes a floor 706 having a first UAV charging contact 708a, a second UAV charging contact 708b, and one or more non-conductive areas 712 that separates the UAV charging contacts 708a-b.

Additionally, as shown in FIG. 7, the landing housing 704 can have a shape that corresponds to the shape of the landing base 608 of a UAV. For example, as shown in FIG. 7, the landing housing 704 of a UAVGS has a complimentary shape to the landing base 608 of the UAV described above in connection with FIG. 6. In particular, the landing housing 704 has a cubic pyramid shape that receives the complimentary cubic pyramid shape formed by the landing pad 610 and legs 614a-d of the UAV.

The shapes of the landing base 608 and landing housing 704 can enable a UAV to self-align within the landing housing 704 as the UAV lands within the UAVGS. For example, the landing base 608 can enter an opening of the landing housing 704 without aligning precisely with the floor 706 of the landing housing 704 and/or at a variety of tilt angles and cause the UAV to self-align within the landing housing 704 when any portion of the landing base 608 and/or landing frame comes into contact with one or more walls of the landing housing 704.

In addition to the shape of the landing housing 704 causing the UAV to self-align, an arrangement of the UAV charging contacts 608a-b can cause the UAV to establish a reliable connection with the UAVGS regardless of a direction or rotational angle of the UAV with respect to the UAVGS. For example, as shown in FIG. 7, the landing base 608 and the floor 706 of the landing housing 704 each have an arrangement of contacts that cause one or more of the charging contacts on the UAV 612a-d to come into contact with and electrically couple to the UAV charging contacts 708a-b when the UAV lands within the UAVGS. Additionally, as shown in FIG. 7, the floor 706 only includes UAV charging contacts 708a-b at opposite corners of the floor 706 ensuring that only one of the charging contacts on the UAV 612a-d come into contact with each of the UAV charging contacts 708a-b. As such, the arrangement of UAV charging contacts 708a-b and charging contacts on the UAV 612a-d can ensure a reliable connection between single contacts irrespective of rotational angle or tilt of the UAV as it comes into contact with the landing housing 704 of the UAVGS.

Figure 8:
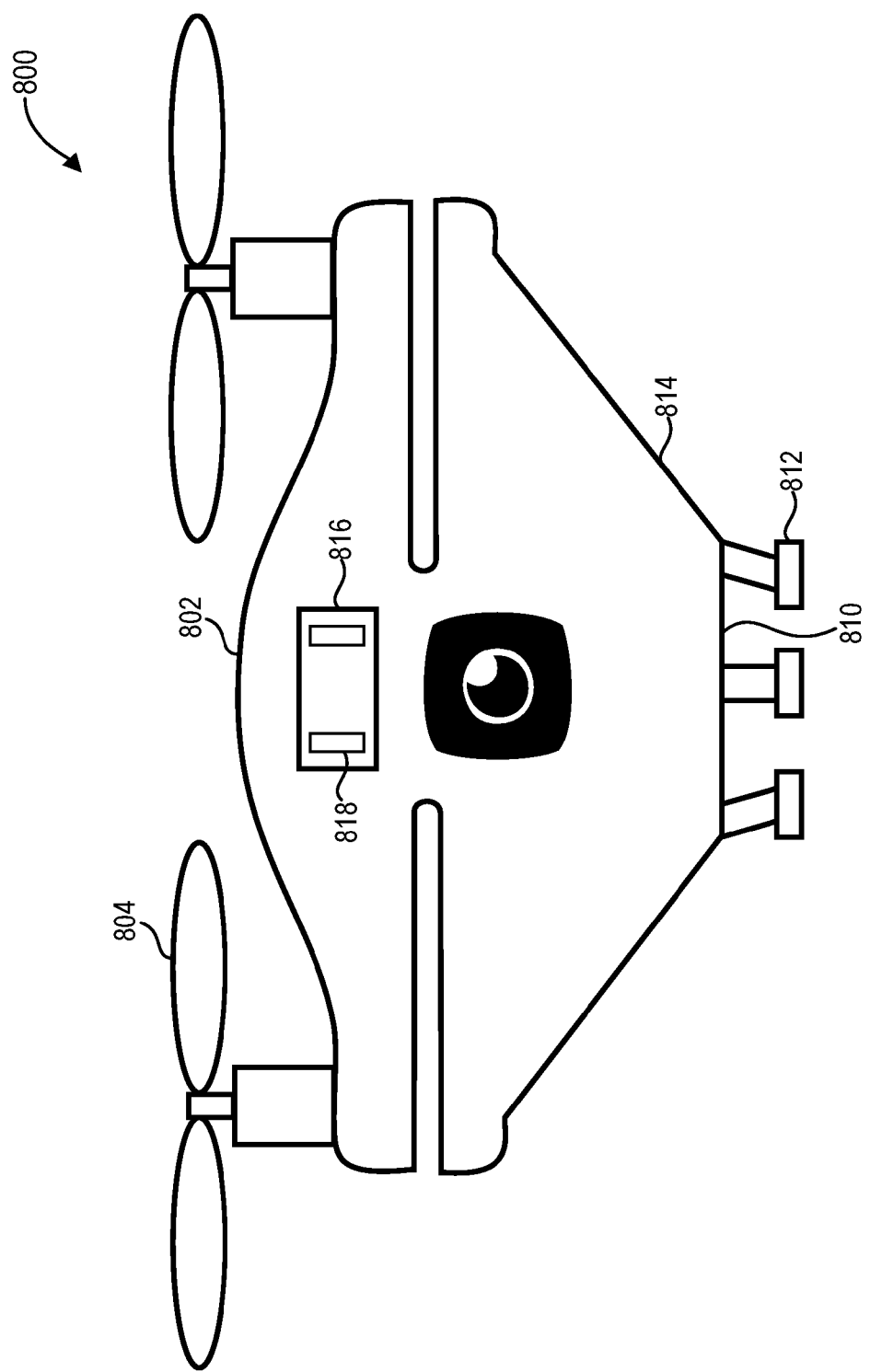
FIG. 8 illustrates a side view of another example unmanned aerial vehicle (UAV) in accordance with one or more embodiments.

FIG. 8 illustrates another example of a UAV 800 having similar features and functionality as one or more embodiments described herein. For example, FIG. 8 illustrates a UAV 800 having a main body 802. The main body 802 can house one or more components of the UAV 800 including, for example, a battery 816 that powers one or more rotors 804 that enable the UAV 800 to fly. Further, as shown in FIG. 8, the battery 816 can include one or more handles 818 that enable a user and/or battery arm to grip the battery 816 and replace the battery 816 when the battery 816 is landed within a UAVGS. Additionally, the UAV can include a landing base including a landing frame 814 coupled to the main body 802 and which connects the main body 802 to a landing pad 810 positioned below the main body 802 of the UAV 800. As shown in FIG. 8, the landing pad 810 can include a plurality of UAV charging contacts 812.

As shown in FIG. 8, the landing base of the UAV 800 can include the landing frame 814. Additionally, as shown in FIG. 8, the landing frame slants inward (e.g., around a central axis) from a top portion of the main body 802 toward a landing pad 810 positioned below the main body 802. In one or more embodiments, rather than having a plurality of legs that make up the landing frame 814, the landing frame 814 can include a single structure that expands around a central axis passing through a center of the UAV 800.

Additionally, rather than one or more UAV charging contacts positioned on a bottom surface of the landing pad 810, the landing base can include a plurality of landing contacts the extend beyond the bottom surface of the landing pad 810. In one or more embodiments, the UAV charging contacts 812 slant downward and inward from the landing pad 810 around a central axis passing vertically through the middle of the UAV 800. For example, as shown in FIG. 8, the UAV charging contacts UAV 812 can include one or more legs that slant downward and inward from the landing pad 810.

Similar to other embodiments described herein, the shape of the main housing 802 and the landing base can cause the UAV 800 to self-align within a landing housing 204 of a UAVGS 102. In particular, as the UAV 800 descends within an opening of a landing housing 204, the charging contacts on the UAV 812, landing pad 810, and/or landing frame 814 can come into contact with a wall of the landing housing 204 and cause the UAV 800 to align with respect to a floor 406 of the landing housing 404 as the UAV 800 successfully docks within the UAVGS 102. Additionally, similar to other embodiments described herein, the charging contacts on the UAV 812 can come into contact with and electrically couple to corresponding UAVGS charging contacts 208a-b and electrically couple one or more embodiments of the UAVGS 102 to the UAV 800. Once coupled, the UAVGS 102 can charge the battery 816 of the UAVGS 800.

FIGS. 1-8, the corresponding text, and the above-discussed examples provide a number of different methods, systems, and devices for autonomously landing a UAV 104. In addition to the foregoing, embodiments can also be described in terms of flowcharts comprising acts and steps in a method for accomplishing a particular result. For example, FIG. 9 may be performed with less or more steps/acts or the steps/acts may be performed in differing orders. Additionally, the steps/acts described herein may be repeated or performed in parallel with one another or in parallel with different instances of the same or similar steps/acts.

Figure 9:
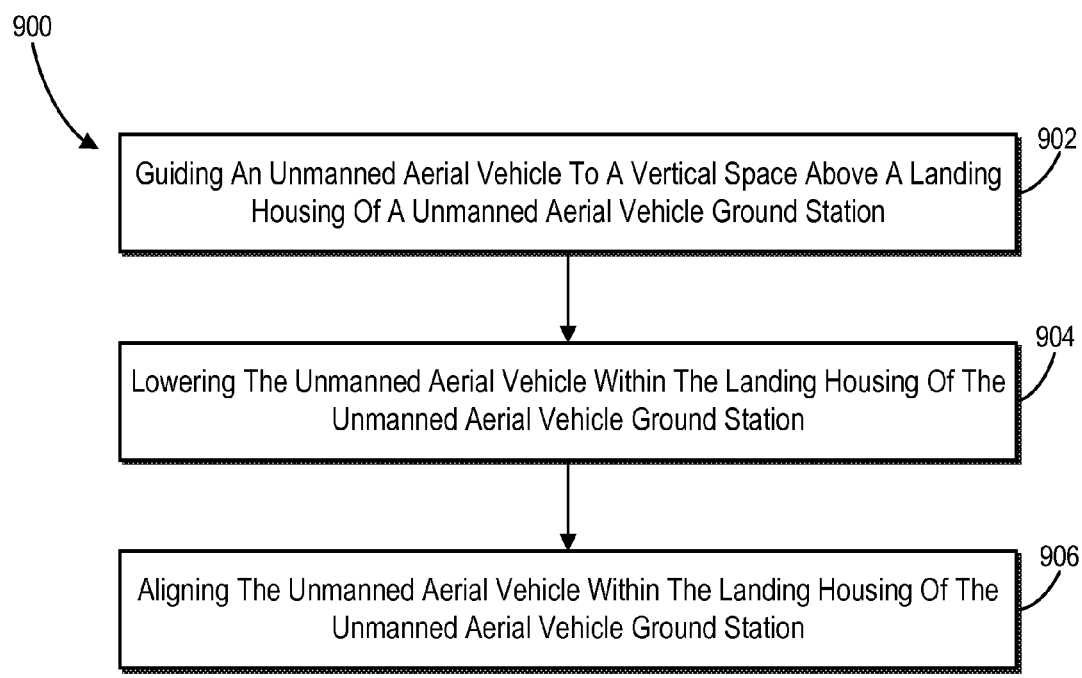
FIG. 9 illustrates a flowchart of a series of acts in a method of autonomously landing a UAV in accordance with one or more embodiments.

FIG. 9 illustrates a flowchart of one example method 900. For example, the method 900 can include a method of autonomously landing a UAV 104 on a UAVGS 102. In one or more embodiments, each step of the method 900 is performed by an autonomous landing system 100 including a UAV 102 and a UAVGS 104. For example, a UAV 102 can perform one or more steps of the method. Additionally or alternatively, a UAVGS 104 can perform one or more steps of the method. In one or more embodiments, the autonomous landing system 100 performs one or more steps in accordance with computer-executable instructions and hardware installed on the UAVGS 102 and/or UAV 104.

As shown in FIG. 9, the method 900 can include a process for landing a UAV 104 within a UAVGS 102. For example, as shown in FIG. 9, the method includes an act 902 of guiding a UAV 104 to a vertical space above a landing housing 204 of a UAVGS 102. In one or more embodiments, guiding the UAV 104 to the vertical space above the landing housing 204 involves flying the UAV 104 toward the UAVGS 102 until the UAV 104 is within a threshold distance to the UAVGS 102. Additionally, guiding the UAV 104 to the vertical space above the landing housing 204 can involve guiding the UAV 104 until some or the entire landing base of the UAV 104 is positioned vertically above opening of the landing housing 204 within the UAVGS 102. Further, in one or more embodiments, the method 900 includes detecting that a battery 316 on the UAV 104 is low and/or receiving a user input (e.g., a command) instructing the UAV 104 to land. In one or more embodiments, the act of guiding the UAV 104 toward the UAVGS 102 is performed in response to detecting that the battery 316 is low and/or in response to receiving a user input.

The method 900 also includes an act 904 of lowering the UAV 104 within a landing housing 204 of the UAVGS 102. In one or more embodiments, the act of lowing the UAV 104 within the landing housing 204 involves lowing the UAV 104 toward the UAVGS 102 until a landing base 308 of the UAV 104 makes contact with an inner wall of the landing housing 204 of the UAVGS 102. In one or more embodiments, lowering the UAV 104 involves causing one or more rotors 306 to change angles and/or speed and cause the UAV 104 to descend from above the landing housing 204 toward an opening of the landing housing 204 shaped to receive the landing base 308 of the UAV 104. Additionally, in one or more embodiments, lowering the UAV 104 involves lowering the UAV 104 until a UAV charging contact 312 and/or landing pad 310 of the landing base 308 comes into contact with an inner wall of the landing housing 204 at any point between an opening of the landing housing 204 and a floor 206 of the landing housing 204. Further, in one or more embodiments, the UAV 104 and/or UAVGS 102 can detect that the UAV 104 and/or portion of the UAV 104 (e.g., the landing base 308) has entered an opening of the landing housing 204 of the UAVGS 102.

The method 900 also includes an act 906 of aligning the UAV 104 within the landing housing 204 of the UAVGS 102. In particular, the act of aligning the UAV 104 within the landing housing 204 can involve causing a landing base 308 of the UAV 104 to contact a landing housing 204 of the UAVGS 102 as the UAV 104 lowers into the UAVGS 104. As the UAV 104 enters the landing housing 204 of the ground station 102, contact between the landing base 308 of the UAV 104 and the landing housing 204 of the UAVGS 104 causes the UAV 102 to self-align within the landing housing 204 of the ground station 104.

As mentioned above, one or more embodiments of the landing housing 204 of the UAVGS 102 and the landing base 308 of the UAV 104 may have complimentary shapes. As such, one or more embodiments of aligning the UAV 104 within the landing housing 204 involves fitting the landing base 308 of the UAV 104 within the complimentary shaped landing housing 204 of the UAVGS 102. For example, where each of the landing housing 204 and the landing base 308 have conical shapes, a conically-shaped landing base 308 can fit within the conically-shaped landing housing 204 by sliding the landing base 308 into the landing housing 204 and causing the landing base 308 to self-align within the landing housing 204 as the UAV 104 lowers into the conically-shaped landing housing 204.

Additionally, while not shown in FIG. 9, the method 900 can include an act of detecting that one or more charging contacts on the UAV 314 on the UAV 104 are coupled to one or more UAVGS charging contacts 208a-b on the UAVGS 102. Additionally, in response to detecting that the charging contacts on the UAV 314 are coupled to the UAV charging contacts 208, the method 900 can include an act of charging a battery 316 on the UAV 104. In particular, an act of charging the battery 316 can involve applying a charge across nodes of the battery 316 via the charging contacts on the UAV 314 and UAVGS charging contacts 208a-b and causing the battery 316 to charge when the UAV 104 is landed and successfully aligned within the landing housing 204 of the UAV 104.

Further, while not shown in FIG. 9, the method 900 can further include one or more additional steps. For example, the method 900 can include an act of replacing a battery 316 of the UAV 104. In one or more embodiments, replacing the battery 316 involves causing a battery arm to remove the battery 316 from a receiving slot of the UAV 104. Additionally, in one or more embodiments, replacing the battery 316 involves causing the battery arm to insert a new battery (e.g., a charged battery) within the receiving slot of the UAV 104. In one or more embodiments, the method 900 can involve replacing the battery in lieu of charging the battery, as explained above. Additionally, in one or more embodiments, the method 900 can involve either charging or replacing a battery 316 in response to receiving an input (e.g., a user input) instructing the UAVGS 102 to either charge the battery 316 or replace the battery 316.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) could be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, watches, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 10:
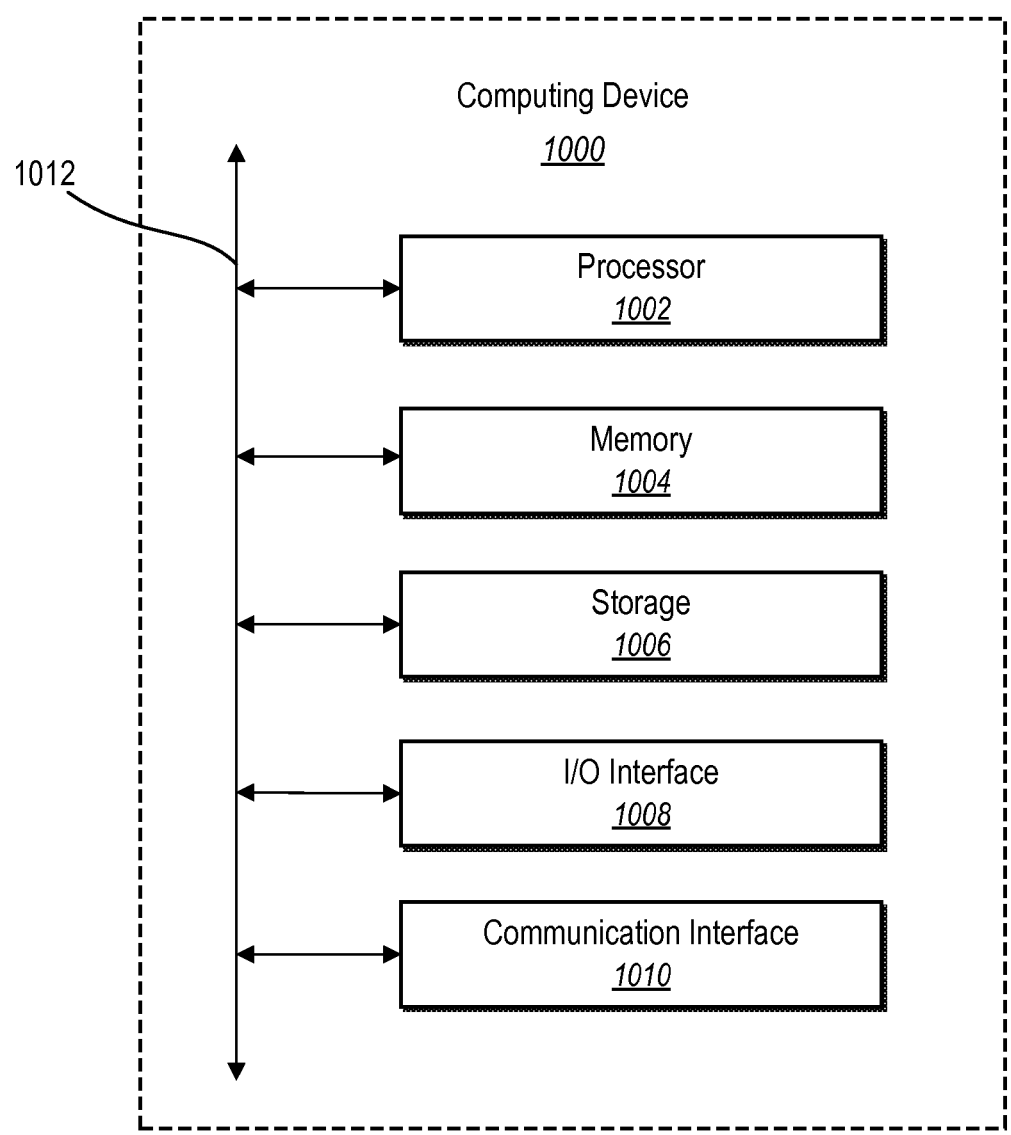
FIG. 10 illustrates a block diagram of an exemplary computing device in accordance with one or more embodiments.

FIG. 10 illustrates a block diagram of exemplary computing device 1000 that may be configured to perform one or more of the processes described above (e.g., as described in connection with the UAV 104 or UAVGS 102). As an example, the exemplary computing device 1000 can be configured to perform a process for autonomously landing a UAV 104. Additionally, the computing device 1000 can be configured to perform one or more steps of the method 1000 described above in connection with FIG. 9. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10. Components of the computing device 1000 shown in FIG. 10 will now be described in additional detail.

In one or more embodiments, the processor 1002 includes hardware for executing instructions, such as those making up a computer program. As an example and not by way of limitation, to execute instructions, the processor 1002 may retrieve (or fetch) the instructions from an internal register, an internal cache, the memory 1004, or the storage device 1006 and decode and execute them. In one or more embodiments, the processor 1002 may include one or more internal caches for data, instructions, or addresses. As an example and not by way of limitation, the processor 1002 may include one or more instruction caches, one or more data caches, and one or more translation lookaside buffers (TLBs). Instructions in the instruction caches may be copies of instructions in the memory 1004 or the storage 1006.

The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The storage device 1006 includes storage for storing data or instructions. As an example and not by way of limitation, storage device 1006 can comprise a non-transitory storage medium described above. The storage device 1006 may include a hard disk drive ("HDD"), a floppy disk drive, flash memory, an optical disc, a magneto-optical disc, magnetic tape, or a Universal Serial Bus ("USB") drive or a combination of two or more of these. The storage device 1006 may include removable or non-removable (or fixed) media, where appropriate. The storage device 1006 may be internal or external to the computing device 1000. In one or more embodiments, the storage device 1006 is non-volatile, solid-state memory. In other embodiments, the storage device 1006 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller ("NIC") or network adapter for communicating with an Ethernet or other wire-based network or a wireless NIC ("WNIC") or wireless adapter for communicating with a wireless network, such as a WI-FI.

Additionally or alternatively, the communication interface 1010 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 1010 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1012 may include hardware, software, or both that couples components of the computing device 1000 to each other. As an example and not by way of limitation, the communication infrastructure 1012 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A system comprising:
a ground station comprising a conically-shaped landing housing; and
an unmanned aerial vehicle (UAV) comprising:
a main body;
a plurality of struts which extend outward from the main body;
a plurality of rotors coupled to the main body; and
a landing base comprising:
a landing pad; and
a landing frame, the landing frame comprising:
one or more legs that extend diagonally upward and outward from the landing pad and extend outward beyond the main body and connect to the plurality of struts, wherein the landing base has a complimentary shape to the conically-shaped landing housing of the ground station such that when the UAV enters the conically-shaped landing housing of the ground station, contact between the one or more legs of the landing base, the landing pad, and the conically-shaped landing housing of the ground station causes the UAV to self-align within the conically-shaped landing housing of the ground station.

2. The system as recited in claim 1, wherein the landing base further comprises a plurality of charging contacts on the landing pad.

3. The system as recited in claim 2, wherein the ground station comprises one or more unmanned aerial vehicle ground station (UAVGS) charging contacts that couple to at least one of the plurality of charging contacts on the landing pad of the landing base when the UAV lands within the conically-shaped landing housing of the ground station.

4. The system as recited in claim 2, wherein the plurality of charging contacts on the UAV are positioned around a perimeter of the landing pad based on corresponding positions of a plurality of unmanned aerial vehicle ground station (UAVGS) charging contacts within the conically-shaped landing housing of the ground station.

5. The system as recited in claim 2, wherein the system comprises:
a first unmanned aerial vehicle ground station (UAVGS) charging contact on the ground station that couples to a first group of one or more contacts from the plurality of charging contacts on the UAV when the UAV lands within the conically-shaped landing housing of the ground station; and
a second UAVGS charging contact on the ground station that couples to a second group of one or more contacts from the plurality of charging contacts on the UAV when the UAV lands within the conically-shaped landing housing of the ground station.

6. The system as recited in claim 5, wherein the plurality of charging contacts on the UAV are spaced apart on the landing pad of the landing base such that none of the first group of one or more contacts connect to a same UAVGS charging contact from the first UAVGS charging contact and the second UAVGS charging contact as any of the second group of one or more contacts when the UAV lands within the conically-shaped landing housing of the ground station.

7. The system as recited in claim 2, wherein the ground station charges a battery on the main body of the UAV when one or more of the plurality of charging contacts on the UAV on the landing pad of the landing base connect to one or more unmanned aerial vehicle ground station (UAVGS) charging contacts within the conically-shaped landing housing of the ground station.

8. The system as recited in claim 1, wherein a slope of the one or more legs extending upward and outward from the landing pad is equal to a slope of a wall of the conically-shaped landing housing.

9. The system as recited in claim 1, wherein the plurality of rotors are connected to the plurality of struts.

10. An unmanned aerial vehicle (UAV), comprising:
a main body;
a plurality of struts which extend outward from the main body;
a plurality of rotors coupled to the main body; and
a landing base, the landing base comprising:
a landing pad positioned below the main body; and
a landing frame connecting the main body to the landing pad via the plurality of struts, the landing frame comprising:
one or more legs that extend diagonally upward and outward from the landing pad and extend outward beyond the main body and connect to the plurality of struts such that as the UAV enters a conically-shaped ground station, interaction between the one or more legs, the landing pad, and the conically-shaped landing housing of a ground station cause the UAV to self-align within the conically-shaped landing housing of the ground station.

11. The UAV as recited in claim 10, wherein the landing pad comprises a circular ring.

12. The UAV as recited in claim 10, further comprising a plurality of charging contacts spaced around a perimeter of the landing pad.

13. The UAV as recited in claim 10, wherein the one or more legs further extend outward beyond the plurality of rotors.

14. The UAV as recited in claim 13, wherein the one or more legs of the landing frame comprise four legs equally spaced about a central axis of the UAV.

15. The UAV as recited in claim 10, wherein the plurality of rotors are connected to the plurality of struts.

16. A method comprising:
- guiding an unmanned aerial vehicle (UAV) to a vertical space above a landing housing of an unmanned aerial vehicle ground station (UAVGS)
- wherein the UAV comprises:
  - a main body;
  - a plurality of struts extending outward from the main body; and
  - a landing base comprising:
    - a landing pad; and
    - a landing frame;
    - wherein the landing frame comprises:
      - one or more legs that extend diagonally upward and outward from the landing pad, extend outward beyond the main body, and connect to the plurality of struts;
- lowering the UAV from the vertical space to within a landing housing of the UAVGS; and
- causing the landing base of the UAV to contact a landing housing of the UAVGS as the UAV lowers into the UAVGS such that when the UAV enters the landing housing of the UAVGS, contact between the one or more legs and the landing pad of the landing base of the UAV and the landing housing of the UAVGS causes the UAV to self-align within the landing housing of the UAVGS.

17. The method as recited in claim 16, wherein causing the UAV to self-align within the landing housing of the UAVGS causes one or more charging contacts on the UAV to couple to one or more charging contacts on the UAVGS.

\* \* \* \* \*